United States Patent
Gimadeev

(10) Patent No.: US 11,001,500 B2
(45) Date of Patent: May 11, 2021

(54) METHOD, APPARATUS AND SYSTEM FOR PRODUCING GRANULATED SOLID CARBON DIOXIDE

(71) Applicant: Irbis Technology LLC, Moscow (RU)

(72) Inventor: Artur Gimadeev, Kazan (RU)

(73) Assignee: Irbis Technology LLC, Moscow (RU)

( * ) Notice: Subject to any disclaimer, the term of this patent is extended or adjusted under 35 U.S.C. 154(b) by 429 days.

(21) Appl. No.: 15/570,690

(22) PCT Filed: May 13, 2016

(86) PCT No.: PCT/RU2016/050011
§ 371 (c)(1),
(2) Date: Oct. 30, 2017

(87) PCT Pub. No.: WO2016/209120
PCT Pub. Date: Dec. 29, 2016

(65) Prior Publication Data
US 2018/0282168 A1    Oct. 4, 2018

(30) Foreign Application Priority Data

Jun. 25, 2015    (RU) ............ 2015127986/05(043390)

(51) Int. Cl.
*B01J 2/22*    (2006.01)
*C01B 32/55*    (2017.01)

(52) U.S. Cl.
CPC ................. *C01B 32/55* (2017.08); *B01J 2/22* (2013.01)

(58) Field of Classification Search
CPC ................... C01B 32/55; B02J 2/22
USPC ......................................................... 264/140
See application file for complete search history.

(56) References Cited

U.S. PATENT DOCUMENTS

| | | | |
|---|---|---|---|
| 1,643,590 A * | 9/1927 | Slate | C01B 32/55 62/604 |
| 1,659,435 A | 2/1928 | Martin, Jr. | |
| 1,801,700 A | 4/1931 | Trindl | |
| 1,894,892 A | 1/1933 | Small | |
| 1,895,886 A | 1/1933 | Lockwood | |
| 1,919,698 A | 7/1933 | Hessling | |
| 1,972,240 A | 9/1934 | Rufener et al. | |
| 2,011,550 A | 8/1935 | Hasche | |
| 2,153,629 A | 4/1939 | Kobold | |
| 2,467,268 A | 4/1949 | Merkle | |

(Continued)

FOREIGN PATENT DOCUMENTS

| | | |
|---|---|---|
| CA | 2862129 | 8/2013 |
| CN | 1847109 | 10/2006 |

(Continued)

*Primary Examiner* — Jeffrey M Wollschlager
*Assistant Examiner* — Xue H Liu
(74) *Attorney, Agent, or Firm* — Dergosits & Noah LLP

(57) ABSTRACT

The present invention relates to the production of granulated solid carbon dioxide mainly for the purpose of cleaning surfaces of parts of various industrial equipment from operational and process surface contaminants and for the purpose of cooling various objects.
Provided herein methods, devices and a system for compacting the solid carbon dioxide particles produced by expanding liquid carbon dioxide, wherein the mechanical energy obtained by converting the pressure energy of the compressed gaseous carbon dioxide produced by said expanding of said liquid carbon dioxide is used for compacting.

13 Claims, 11 Drawing Sheets

(56) References Cited

U.S. PATENT DOCUMENTS

| | | |
|---|---|---|
| 2,543,170 A | 2/1951 | Hill |
| 3,070,967 A | 1/1963 | Uren |
| 3,112,670 A | 12/1963 | Litz, Jr. |
| 3,443,389 A | 5/1969 | Townsend et al. |
| 3,576,112 A | 4/1971 | Frost et al. |
| 3,618,330 A | 11/1971 | Hardt |
| 3,632,271 A | 1/1972 | Tyree, Jr. |
| 3,650,182 A | 3/1972 | Phillips |
| 3,670,516 A | 6/1972 | Duron et al. |
| 3,708,993 A | 1/1973 | Hardt et al. |
| 3,835,657 A | 9/1974 | Scudder |
| 3,952,530 A | 4/1976 | Tyree, Jr. |
| 4,033,736 A | 7/1977 | Cann |
| 4,374,658 A | 2/1983 | Kawaguchi |
| 4,727,687 A | 3/1988 | Moore |
| 4,780,119 A | 10/1988 | Brooke |
| 5,018,667 A | 5/1991 | Llyod |
| 5,249,426 A | 10/1993 | Spivak et al. |
| 5,419,138 A | 5/1995 | Anderson et al. |
| 5,426,948 A | 6/1995 | Hyde, Jr. |
| 5,458,960 A | 10/1995 | Nieminen et al. |
| 5,473,903 A | 12/1995 | Llyod et al. |
| 5,475,981 A | 12/1995 | Becker |
| 5,503,198 A | 4/1996 | Becker |
| 5,548,960 A | 8/1996 | Anderson et al. |
| 5,735,140 A | 4/1998 | Becker et al. |
| 5,845,516 A | 12/1998 | Allen, Jr. |
| 6,189,336 B1 * | 2/2001 | Wade, Jr. ............... C01B 32/55 62/604 |
| 6,240,743 B1 | 6/2001 | Allen, Jr. |
| 6,439,836 B1 | 8/2002 | Pozivil |
| 6,442,968 B1 | 9/2002 | Proni et al. |
| 6,986,265 B2 | 1/2006 | Johansen |
| 7,021,081 B2 | 4/2006 | Becker |
| 8,187,057 B2 | 5/2012 | Broecker |
| 2012/0291479 A1 | 11/2012 | Anderson et al. |

FOREIGN PATENT DOCUMENTS

| | | |
|---|---|---|
| CN | 103918417 | 4/2014 |
| CN | 203991508 | 12/2014 |
| CN | 104321164 | 1/2015 |
| DE | 2051506 | 4/1972 |
| DE | 20006953 | 7/2000 |
| EP | 247935 | 12/1987 |
| EP | 786311 | 7/1997 |
| EP | 792837 | 9/1997 |
| EP | 2280872 | 11/2009 |
| FR | 2778231 | 11/1999 |
| RU | 2235827 | 9/2004 |
| RU | 2315165 | 1/2008 |
| RU | 2362890 | 1/2009 |
| RU | 2365486 | 2/2009 |
| RU | 2350557 | 8/2011 |
| SU | 1465682 | 3/1989 |
| WO | 13116710 | 8/2013 |

* cited by examiner

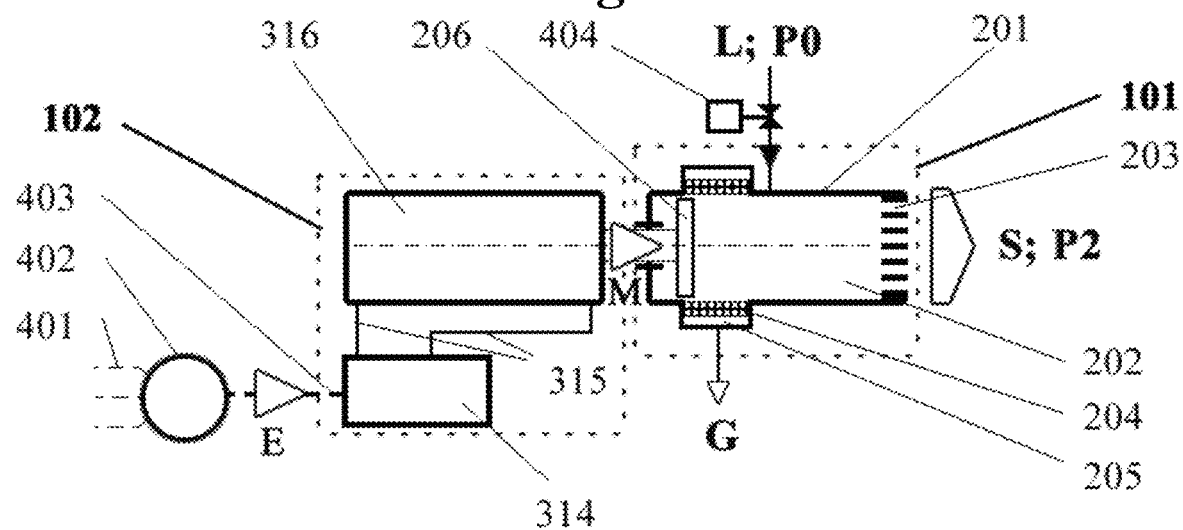
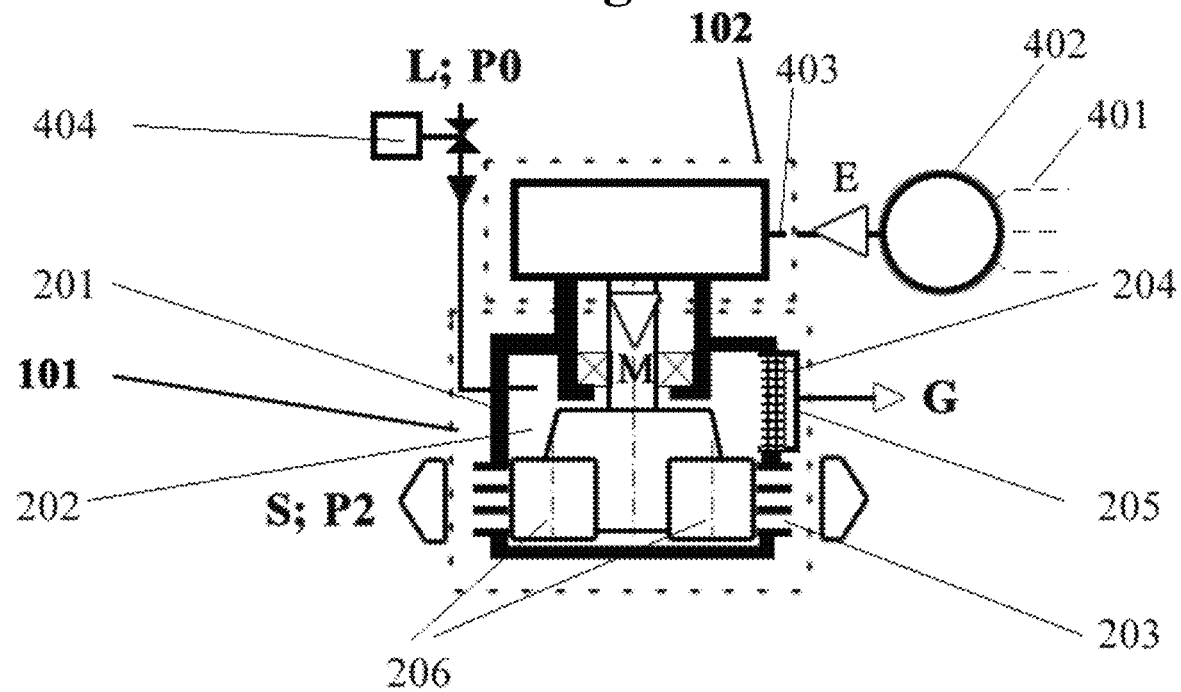

METHOD, APPARATUS AND SYSTEM FOR PRODUCING GRANULATED SOLID CARBON DIOXIDE

CROSS-REFERENCE TO RELATED APPLICATIONS

The present Application is a U.S. National Phase of International Application No. PCT/RU2016/050011, filed on May 13, 2016, which claims the benefit of Russian Patent Application No. RU20150127986, filed on Jun. 25, 2015, the entire contents of which are incorporated by reference herein.

TECHNICAL FIELD

The present invention relates to the production of granulated solid carbon dioxide. Granulated solid carbon dioxide is used for the purpose of blast cleaning of the surfaces of parts of various industrial equipment from operational and process surface contaminants (RU2365486, RU2362890, U.S. Pat. No. 8,187,057, EP2280872, EP0786311, DE201320006953, CN203991508, CN104321164, CA2862129) and for cooling various objects (RU2235827, RU2315165, U.S. Pat. Nos. 2,467,268, 5,503,198, CN1847109, CN103918417).

For these applications, the compacted granule structure, in contrast to solid carbon dioxide granules, also known as carbon dioxide "snow" and produced directly by a sudden reduction of pressure of liquid carbon dioxide (p. 6 of U.S. Pat. No. 1,972,240), provides more efficient cleaning due to a higher hardness, allows to dose solid carbon dioxide, contributes to an increase in the storage time of solid carbon dioxide before its use.

BACKGROUND

One of the earliest prior art devices for producing granulated solid carbon dioxide is Valdemar Hussling's device (U.S. Pat. No. 1,919,698, 1928). Currently relatively known to the skilled in the present field of invention are devices for producing granulated solid carbon dioxide from such producers as ColdJet (USA and Belgium; www.coldjet.com; U.S. Pat. No. 5,473,903; US2012/0291479); AscoCarbonDioxide (Switzerland www.ascoco2.com), IceTech (Denmark and the USA, www.icetechworld.com), AquilaTriventek (Denmark, www.aquila-triventek.com, U.S. Pat. No. 6,986,265), TOMCO2 Systems (USA, www.tomcosystems.com), COMTECSWISS "(Switzerland, www.comtecswiss.com)," ARTIMPEX "(Denmark; http://www.cryonomic.com)" SinoceanIndustrialLimited "(China; www.china-ice-machine.com)," AutoGazTrans "(Russia, Samara, www.agtrans.ru), "Research Institute of Technology, Control and Diagnostics of Railway Transport "(Russia, Omsk; www.niitkd.com; RU2350557) and others.

The process of granulating solid carbon dioxide can be implemented in one step or in two steps. The first step is pressing (or compressing) solid carbon dioxide particles to a relatively solid structure (an amount of confined space containing solid carbon dioxide particles is reduced). To increase the granulating density of solid carbon dioxide and, as an addition, the production of a number of granules at the same time there is a step of extruding the compressed solid carbon dioxide particles through a member for extruding solid carbon dioxide with a more solid structure, wherein the pressing member is configured to form various profiles of one or more producing solid carbon dioxide granules.

To implement said processes a use of complex and overall power systems (actuators), such as hydraulic systems or crank-shaft mechanisms working in conjunction with a gear box, is required, and, as a consequence, the disadvantage of prior art devices is that the actuators are mainly powered by a motor (claim 8 of U.S. Pat. No. 7,021,081; claim 6 of U.S. Pat. No. 6,240,743; claim 1 of U.S. Pat. No. 5,845,516; claim 1 of U.S. Pat. No. 5,735,140) to supply power either for a hydraulic pump, an air compressor or a crank-shaft mechanism, and, as a consequence, there is a need for an external power source, and the unit becomes less mobile and more energy-dependent.

Prior art devices are not only heavy and overall (col. 5 and 6 of U.S. Pat. No. 5,419,138, col. 1 of U.S. Pat. No. 6,986,265), but require relatively frequent maintenance as they have a hydraulic system or a relatively large number of friction pairs in the mechanism.

In case of prior art devices operating on compressed air (U.S. Pat. No. 5,735,140), the installation of a receiver and air preparation system is necessary for their reliable operation, which leads to an increase in the mass and dimensions of the entire system as a whole.

Another disadvantage in terms of energy efficiency of prior art devices is lack of use of potential energy that can be obtained during the process of expanding gaseous carbon dioxide from the pressure of the triple point of carbon dioxide to the ambient pressure. Conventionally, gaseous carbon dioxide is only subjected to the "Flash"-effect (Paragraph 0002 of EP0792837), which has a scientific and technical name "Joule-Thomson effect" (col. 1, line 15 of U.S. Pat. No. 2,011,550, col. 3, line 18 of U.S. Pat. No. 1,659,435, claim 1 of EP0247935). In this description, a term "sudden pressure reduction" will be used to describe the processes of the "Flash"-effect and the Joule-Thomson effect.

FIG. 1 illustrates a schematic diagram of a system for granulating solid carbon dioxide particles. The prior art device for producing granules from solid carbon dioxide particles 1 is connected to a tank for storage of liquid carbon dioxide 2 (for example, produced by AvtoGazTrans, ChartFeroxa.s, Linde, AscoCarbonDioxideLtd and AirProductsandChemicalsInc) via the main pipeline 4 to supply liquid carbon dioxide from the tank 2, the supply being performed by means of the pressure of the primary carbon dioxide (G2) (FIG. 1 U.S. Pat. No. 2,543,170, FIG. 1 U.S. Pat. No. 3,952,530, FIG. 1 U.S. Pat. No. 3,443,389). Conventionally, devices 1 consume electricity from an industrial power grid source 3 for the operation of the following device units 1: a control system (PLC programmable logic controllers, microelectronics, valves, sensors, auxiliary actuators, etc.); a heating system for individual structural elements; and a power block (or actuator), which can be designed as an electric motor operating in conjunction with a hydraulic system or with a crank-shaft mechanism, or as an air compressor with a pneumatic actuator, or with another mechanical device configured to have a direct impact via the mechanical energy converted from the energy of an external energy source on solid carbon dioxide particles. When the devices 1 reach the stationary operation mode the almost unchanged time-averaged preset performance of the devices 1 for solid carbon dioxide corresponds to, the mass balance of the devices 1 corresponds to the formula $L=G+S$, where L is the mass flow rate of liquid carbon dioxide (L), G is the mass flow of gaseous carbon dioxide (G) and S is the mass flow rate of solid carbon dioxide (S). Based on its physical properties, liquid carbon dioxide (L) can be stored in the industry at a pressure from the triple point of carbon dioxide (0.51 MPa) to the critical pressure (7.5 MPa), the line a1-a2 corresponds to this range. The processes for producing low amounts of granules from solid carbon dioxide (S) particles conventionally used in the industry are characterized by the following parameters (col 1 line 45 of U.S. Pat. No. 5,845, 516, col 2 line 16 of U.S. Pat. No. 5,548,960, col 3 line 33 of EP0792837): liquid carbon dioxide (L) is stored at a pressure of 265-300 psi (1.6-2.07 MPa) and a relative temperature of 245-253 degrees Kelvin in a special tank 2; the pressure of the exhausted gaseous carbon dioxide (G) at the outlet of the device 1 equals approximately the atmospheric pressure (col 6 line 19 of U.S. Pat. No. 5,473,903); the factor of conversion of liquid carbon dioxide (L) into solid carbon dioxide (S) after a sudden reduction of pressure of liquid carbon dioxide (L) to the atmospheric pressure is 0.45-0.5 in mass (col. 1 line 37 of U.S. Pat. No. 3,952,530, col. 1 line 13 of EP0792837).

FIG. 2 illustrates a TS diagram for a good understanding of the prior art method for producing granules from solid carbon dioxide particles. Point A1 is disposed on the saturation line a1-a2 and characterizes the state of carbon dioxide in a liquid aggregate state (L) when being stored in a tank at a pressure of 1.8 MPa (chosen for example), the line A1-A2 shows the process of a sudden reduction of pressure of liquid carbon dioxide (L) from point A1 to point A2, where point A2 indicates the thermodynamics equilibrium of the mixture of solid carbon dioxide (S) (point A3) and gaseous carbon dioxide (G) (point A4), based on this, the fraction of solid carbon dioxide produced is equal to the result of division of the value of length of the segment A2-A4 by the value of length of the segment A3-A4 and is about 0.51 (51%).

For a good understanding of the present invention, the prior art method for producing granulated carbon dioxide is presented as the following steps:
(a) a step of supplying liquid carbon dioxide (L) which is being stored in the source at the storage pressure (P0) that is above the pressure of the triple point of carbon dioxide;
(b) a step of inflowing of said liquid carbon dioxide (L) from said source into the chamber (or the pressing block);
(c) a step of reducing the pressure of the liquid carbon dioxide (L) supplied to said chamber (or the pressing block) to produce said solid carbon dioxide (S) particles and compressed gaseous carbon dioxide (G) within the chamber (or the pressing block);
(d) a step of removing said gaseous carbon dioxide (G), conventionally at the atmospheric pressure, from said chamber;
(e) a step of moving of an actuator's external element in response to an external energy (most often an electricity impact) applied to said actuator;
(f) a step of moving of the pressing member disposed in said chamber in response to the movement of said external element of said actuator;
(g) a step of pressing said solid carbon dioxide (S) particles in said chamber by moving the pressing member;
Further on, in order to obtain granulated solid carbon dioxide as one or more higher density granules, the following step is used in addition to the previous ones:
(h) a step of releasing the compressed solid carbon dioxide particles from said chamber through a hole in the form of said granules by the movement of the pressing member.

For a good understanding of the generalized and simplified schematic representations of the devices, to unify the names, to prove the similarity of prior art devices to one another, and to generalize them, in order to prove the relative similarity of the preferred embodiment of the present invention to prior art devices, the following approach to number device elements will be used: for the main device blocks, the numbering begins with 100; for the components of the pressing block 101, the numbering begins with 200; for the components of the power block 102, the numbering begins with 300; for other unsaid elements and parts of the device, the numbering begins with 400.

FIG. 3 illustrates a general schematic representation of prior art devices for producing granules from solid carbon dioxide particles. The devices comprise a pressing block 101 configured to press and extrude solid carbon dioxide particles (S) through a die and the power block 102 converting the energy (E) from an external power source, conventionally not connected to carbon dioxide, to the mechanical energy (M) transferred to the pressing block 101 to press and extrude the solid carbon dioxide particles (S) produced by a sudden reduction of pressure of liquid carbon dioxide (L) passing to the pressing block 101. Gas (G) is also produced in case of said sudden reduction of pressure of liquid carbon dioxide (L), is a by-product and is transferred either to the atmosphere or to the recovery system. In this case, the power block conventionally works via a source of electrical energy or a source of energy of a substance flow (e.g. air or hydraulic oil) and has an external element movable in response to the external energy supplied to the power block. The external element can be represented as a rotating shaft of an electric motor and reducer, a reciprocating bar of a hydraulic cylinder, a pneumatic cylinder or a crank-shaft mechanism. External energy can have an electrical or pneumatic, or hydraulic nature widespread in the industry.

Among the prior art, the pressing block 101 is known to the skilled in the present field of invention as:
(a) a cylindrical chamber terminated by a die at one end (a member for extruding) with through holes and by a moving piston at the other end, for example: US2012/0291479 (hereinafter referred to as a piston pressing block, illustrated in FIG. 4, FIG. 5 and FIG. 6 as part of the devices);
(b) a cylindrical chamber with through holes and rollers rotating around the axis of the cylindrical chamber and rolling along the inner peripheral surface of the cylindrical chamber (hereinafter referred to as a roller pressing block; is illustrated in FIG. 7 as part of the device);
(c) a rotating rotor with the moving blades positioned non-coaxially relative to the inner cylindrical surface of the chamber (hereinafter referred to as a blade-type pressing block; is illustrated in FIG. 8 as part of the device), the pressing block conventionally comprising:
(a) one chamber (cylindrical or of another form) having an end wall (the end wall of the cylindrical chamber, a lateral surface of the cylindrical chamber or another wall of the chamber for pressing solid carbon dioxide particles) and configured to receive liquid carbon dioxide (L) and to convert liquid carbon dioxide (L) into compressed gaseous carbon dioxide (G) and solid carbon dioxide particles (S);
(b) an actuator (a power block) having an external member movable in response to said external energy applied to said actuator;
(c) a pressing member (or a piston, plunger, roller) movable in response to the movement of an external member of said actuator and disposed within said chamber; the movement of said pressing member compresses the solid carbon dioxide (S) particles created in said chamber towards said end wall of said chamber; and Further on, to obtain granulated solid carbon dioxide as granules, the following element is required in addition to the previous ones:

(d) at least one hole (or a die or a member for extruding) disposed in the end wall of said chamber to release the compressed solid carbon dioxide particles (S) from said chamber in the form of said granules;

wherein the power block (or actuator) 102 mainly operates via the electric power of the industrial network to supply the electric motor and is known to the skilled in the present field of invention as:

(a) a hydraulic actuator that generates reciprocating motion and power due to the potential energy of hydraulic oil from a hydraulic pump (hereinafter referred to as a hydraulic power block; is illustrated in FIG. 4 as part of the device);

(b) a pneumatic actuator working via the air produced by an air compressor and generating reciprocating motion and power (hereinafter referred to as a pneumatic power block; is illustrated in FIG. 6 as part of the device);

(c) a crank-shaft actuator generating reciprocating motion and power from an electric motor (hereinafter referred to as a crank-shaft power block; is illustrated in FIG. 5 as part of the device);

(d) a gear reducer configured to reduce the rotation speed and to increase the torque (hereinafter referred to as a reducer power block; is illustrated in FIG. 7 and FIG. 8 as part of the device);

where force or torque are transmitted in turn to the pressing block to press or to press and extrude solid carbon dioxide.

The most well-known to the skilled in the present field of invention are the prior art devices formed by the following tandems of said blocks:

(a) a piston pressing block operating in conjunction with a hydraulic power block (or actuator) (U.S. Pat. Nos. 3,070,967, 4,727,687, 4,780,119, 3,632,271, 5,548,960, 5,419,138, 5,475,981, 3,835,657, DE2051506, U.S. Pat. Nos. 6,240,743, 5,845,516, 5,426,948, 7,021,081, SU1465682), the simplified schematic representation of said devices is illustrated in FIG. 4; the inventions above in this claim in the present description are referred to as hydraulic devices;

(b) a piston pressing block operating in conjunction with a crank-shaft power block (or actuator) (U.S. Pat. Nos. 1,919,698, 6,986,265, 3,708,993, 3,618,330, 3,576,112), the simplified schematic representation of said devices is illustrated in FIG. 5, in the present description of the invention, said devices in this claim are referred to as crank-shaft devices;

(c) a piston pressing block operating in conjunction with a pneumatic power block (or actuator) (U.S. Pat. Nos. 1,894,892, 5,735,140), the simplified schematic representation of said device is illustrated in FIG. 6, in the present description, the invention of said device in this claim is referred to as a pneumatic device;

(d) a blade-type pressing block operating in conjunction with a reducer power block (or actuator) (U.S. Pat. No. 6,442,968), the simplified schematic representation of said device is illustrated in FIG. 8, in the present description, the invention of said device in this claim is referred to as a blade-type device;

(e) a ring-type pressing block operating in conjunction with a reducer power block (or actuator) (U.S. Pat. Nos. 5,249,426, 4,033,736, 3,670,516), the simplified schematic representation of said devices is illustrated in FIG. 7, in the present description of the invention, said devices in this claim are referred to as ring-type devices;

Said (hydraulic, crank-shaft, gas, blade-type and ring-type) devices in this description refer to prior art devices.

In the claims of the inventions of said patents there are the following essential features describing power blocks (or actuators) and their physics of action: "means for moving said piston", "hydraulic drive unit connected to said ram", "said piston being movable on the compression stroke", "a unit chamber with hydraulic means", "said hydraulic drive unit being designed to supply sufficient force to said ram", "piston is a hydraulic operated", "disconnecting an extrusion cylinder from a hydraulic cylinder", "said pressure piston is hydraulically operated", "pistons in the pressing chambers are connected with a common crankshaft", "crank shaft drive said piston", "pneumatic actuator having an output member movable in response to compressed air", "dry ice pelletizer having an external power source", "force produced by said forcing means", "power means for driving the rotary elements".

Further on in the description to describe an actuator and a power block the concept "power block" will be used.

FIG. 4, FIG. 5 and FIG. 6 illustrate a simplified schematic representation of prior art hydraulic, crank-shaft and pneumatic devices that comprise a piston pressing block 101 operating in conjunction with the power block 102. The pressing block 101 comprises a case 201 with an inner chamber 202 of a cylindrical form, the die 203 disposed to the case 201 at one end and the pressing member 206 disposed within the chamber 202 terminates the chamber 202 from the second end. The filtering element 204 formed in the case 201 connects the interior of the chamber (a member for extruding) 202 to a collecting device 205 to collect gaseous carbon dioxide. The valve 404 is configured to supply liquid carbon dioxide to the chamber 202. The devices of this type are connected to an external power source 402, which is in turn conventionally connected to a three-phase power network 401 and is having kinematical connection 403 connected to the power block 102. In devices of these types, the solid carbon dioxide (S) particles disposed in the chamber 202 are compacted by extruding it through a die 203 by means of a pressing member 206 via the mechanical energy (M) transmitted from the power block 102, which in turn consumes external energy (E).

The power unit 102 of the prior art hydraulic device illustrated in FIG. 4 has a block 309 which is configured to supply hydraulic oil under pressure along the lines 305 to a hydraulic cylinder 306 in which a piston 307 is disposed in order to transfer the power load from the hydraulic oil to the pressing member 206 via a bar 308. The block 309 is having kinematical connection 403 connected to the external power source 402 via which external energy (E) is transmitted for the work of the block 309.

The power block 102 of the prior art crank-shaft mechanism illustrated in FIG. 5 has a case 310 that comprises a crankshaft 311 connected to at least one pressing member 206 via a corresponding crank 312. The crank 312 converts the rotational motion of the crankshaft 311 into the reciprocating motion transmitted to the pressing member 206 as mechanical energy (M). The shaft 311 is connected via a reducer 405 and kinematical connection 403 to the actuator 402 that transmits.

The power block 102 of the prior art pneumatic device illustrated in FIG. 6, has a case 314 which is configured to compress, prepare and deliver air through the lines 315 to a pneumatic actuator 316 transmitting mechanical energy (M)

to the pressing member 206. External energy (E) is conventionally transmitted via kinematical connection 403 from the driver 401 to the case 314.

FIG. 7 illustrates a simplified schematic diagram of a prior art ring-type device that comprises a ring-type pressing block 101 operating in conjunction with the power block 102. The pressing block 101 has a case 201, a die (or a member for extruding) 203, a filtering element 204, a collection device 205, an inner chamber 202 of a ring form with pressing members 206 therein rolling around the inner surface of the inner chamber 202. The valve 404 is configured to supply liquid carbon dioxide to the chamber 202. Devices of this type are connected to an external power source 402, which is in turn conventionally connected to a three-phase power network 401 and is having kinematical connection 403 connected to the power block 102 in order to transfer external energy (E). The solid carbon dioxide in the inner chamber 202 is compacted by extruding it through the die 203 by means of the pressing members 206.

FIG. 8 illustrates a prior art blade-type device that comprises a blade-type pressing block 101 operating in conjunction with the power block 102. The pressing block 101 has a case 201, a collection device 205, an inner chamber 202 of a cylindrical form with a cylindrical pressing member 206 therein so that the center of the chamber 202 does not coincide with the center of the rotating device 207. The pressing member 206 comprises movable blades 207 configured to penetrate into the pressing member 206. The valve 404 is configured to supply liquid carbon dioxide to the chamber 202. Devices of this type are connected to the external power source 402, which is in turn connected conventionally to the three-phase power network 401 and is having kinematical connection 403 with the pressing member 206 for transferring of external energy (E). In the blade-type device, the solid carbon dioxide particles (S) are captured by the blades 207. The solid carbon dioxide (S) particles are compacted by reducing the volume between the blades 207 due to the non-axial rotation of the pressing member 206 relative to the cylindrical interior 202, where the pressing member 206 rotates via the mechanical energy (M) transmitted from the power block 102.

The step of separating gaseous carbon dioxide gas (G) from solid carbon dioxide particles (S), referring to the prior art method for producing granules from solid carbon dioxide particles, is conventionally implemented by filtration with the filtering element 204 configured to retain a substantial number of solid carbon dioxide particles (S) and allowing gaseous carbon dioxide (G) to flow through the case of the filtering element 204. For example, in the prior art devices, the filtering element 204 is designed as holes in the pressing chamber (FIG. 2, U.S. Pat. No. 7,021,081), as a steel wire grid (FIG. 4a, U.S. Pat. No. 6,240,743), formed as a pipe with the walls made of sintered plastic or bronze particles (claim 1, U.S. Pat. No. 5,548,960).

The collecting device 205 can conventionally be designed as a hollow chamber to collect gas either as a separate device element or it can be formed within the case of the chamber 201.

The member for extruding (the extruding die) 203 can be formed as a flange with cylindrical holes, with conical holes or with holes of a special form, formed as the metal plates installed across the flow of the extruded solid carbon dioxide, or in a different embodiment if the geometry of the flow section compacts the extruded compacted solid carbon dioxide and imparts a pre-selected cross-sectional form.

The main structural elements of the device, such as the chamber 201, the die 203 and the pressing member 206 are conventionally made of special steel, for example, of 14X17N2 corrosion-resistant heat-resistant steel.

The step of sudden pressure reduction, referring to a prior art method for producing granules from solid carbon dioxide particles, is implemented conventionally via the valve 404 illustrated in FIG. 4-9 or by means of special devices having a local hydraulic resistance, such as, for example, U.S. Pat. No. 5,018,667. A special solenoid valve for liquid carbon dioxide produced by JAKŠA d.o.o., ASCO ValveInc or some other manufacturer can be used as a valve 404. To increase the density of packing solid carbon dioxide (S) particles in case of expansion of liquid carbon dioxide (L) in the chamber, it is reasonable to direct liquid carbon dioxide (L) flowing into the chamber towards the member for extruding, such as in FIG. 4, U.S.20120291479.

Said types of prior art devices have the same operating principle, which consists in transforming the external energy (E) into mechanical (M) via the power block 102, which is transmitted to the pressing member 206 for pressing and extruding solid carbon dioxide particles (S) beyond the limits of the pressing block 101. With that, the extrusion is implemented through the die 203, and the solid carbon dioxide particles (S) in the chamber 202 are formed by a sudden pressure reduction of the liquid carbon dioxide (L) in the chamber 202 to a pressure close to the atmospheric pressure, and solid carbon dioxide particles are retained via the filtering element 204.

The U.S. Pat. Nos. 3,952,530, 3,632,271 and DE2051506 mention the possibility of maintaining gaseous carbon dioxide at a pressure of 25-40 psi in the pressing block (or in the chamber disposed in the pressing block), (claim 5, col. 4, line 33 of U.S. Pat. No. 3,952,530; claim 24 of DE2051506, claim 1 of U.S. Pat. No. 3,632,271), which is about 0.17-0.28 MPa. The pressure, according to FIG. 9 of DE2051506 and FIG. 1 of U.S. Pat. No. 3,952,530 is maintained through four main aspects of design and operation of the devices: the presence of the sealed chamber 201 of the pressing block 101 isolated from the environment; the presence of a sealing of piston bar 206 (a pressing member 206) to isolate the interior 202 of the chamber 201 of the pressing block 101 from the environment; the maintenance of pressure (P1) from the output line of gaseous carbon dioxide (G); the tight adherence of the compacted solid carbon dioxide particles (S), when operating in the stationary mode, to the inner surface of die holes 203 from the interior 202 of the pressing block 101 (with that, the adherence is performed both by the pressure of the pressing member 206 and the pressure of gaseous carbon dioxide gas (G). Thus, it is technically possible to maintain the pressure (P1) of gaseous carbon dioxide (G) in the pressing block 101 above the ambient pressure. The outlet of gaseous carbon dioxide at a pressure above the atmospheric pressure from the devices for producing granules from solid carbon dioxide particles, based on the purposes of the U.S. Pat. Nos. 3,952,530 and 3,632,271, is required to reduce the energy consumption of the gaseous carbon dioxide recovery systems produced by Union Engineering, Haffmans, Asco Carbon Dioxide, BUSE Gastek and others. The sealing of piston bar can be made of PTFE material, for example, Polon® Parker, to prevent friction of the piston against the inner surface of the chamber, antifriction wear guides made of special material are fixed on the piston as illustrated in FIG. 7 of U.S.20120291479, nylon or nylon-based composite material, for example, the technical solutions of Mustang Seal Solution (USA) may be such material.

A method for converting the energy of the pressure difference (A) between gas pressure and lower level pressure into mechanical energy (M) under conditions of gas pressure reduction is relatively well-known. Devices that can implement this method are identified as gas expanders. Gas expanders are mainly divided into volumetric expanders and flowing expanders. Volumetric expanders convert the energy of the pressure difference between gas pressure and lower level pressure into the reciprocating energy of the piston, they include piston expanders and gas cylinders, which are a special case of a piston expander. Flowing expanders convert the energy of the pressure difference between gas pressure and lower level pressure into the rotational energy of the blade wheel, these include turbo expanders. A more detailed description of the expanders will be provided hereinafter.

Previously, the following technical solutions were developed in order to increase the efficiency of the process of production of solid carbon dioxide in terms of thermodynamic efficiency (energy efficiency), which are the closest to the present invention:

(a) U.S. Pat. No. 2,153,629 which mentions a device that allows to use liquid carbon dioxide (L) as a hydraulic fluid for the work of a hydraulic cylinder;
(b) U.S. Pat. No. 1,895,886 which mentions a device that increases the mass fraction of solid carbon dioxide (S) by transferring a portion of energy to rotate the blade wheel via a carbon dioxide flow after a sudden reduction of pressure of liquid carbon dioxide (L) below the triple point pressure; the method for converting the energy of a high-speed gas blast into mechanical energy (M) is identified as "gas expanding", and said device relates to turbo expanders;
(c) Patent No. EP0792837 which mentions a two-step (with the intermediate pressure) sudden reduction of pressure of liquid carbon dioxide (L). The intermediate pressure (P1) is above the pressure of the triple point of carbon dioxide. Referring to FIG. 4 of EP0792837 it is intended to use the gaseous carbon dioxide (G) produced between the first and second step to produce useful energy for various purposes; and
(d) U.S. Pat. No. 1,181,816 which mentions a method for compacting particles by means of a liquid carbon dioxide flow (L) passing through the particles pressed by the filter.

Patent Application FR19980005374 was found in the patent analysis.

All said prior art devices create three technical possibilities:
(a) the use of external power sources for producing mechanical energy (M) to compact solid carbon dioxide particles (S), which leads to such disadvantages as a relatively high energy consumption, a relatively high degree of energy dependence on external energy sources, a relatively high mass and a relatively low mobility of the devices;
(b) recovering gaseous carbon dioxide (G) at a pressure (P1) above the ambient pressure;
(c) converting the energy of pressure of the gaseous carbon dioxide (G) extracted from the pressing block into mechanical energy (M) to compact solid carbon dioxide particles (S) in a specially provided device (P1).

Problem statement: Due to the above said, a method, device and system are required, which is further an object of the present invention, to eliminate the problems relating claim "a" by combining the two technical possibilities described in claims "b" and "c".

BRIEF DESCRIPTION OF THE DRAWINGS

FIG. 6 illustrates a simplified schematic representation of a prior art pneumatic device for producing solid carbon dioxide granules.

FIG. 7 illustrates a simplified schematic diagram of a prior art ring device for producing solid carbon dioxide granules.

DESCRIPTION OF THE INVENTION

Within the scope of the present invention methods, devices and a system are provided for producing granulated solid carbon dioxide by compacting the solid carbon dioxide (S) particles produced by means of expanding the liquid carbon dioxide (L), characterized by the fact that the mechanical energy (M) produced by converting the energy of pressure (P1) of the carbon dioxide gas (G) produced by said expansion of said liquid carbon dioxide (L) is used for granulating.

Therefore, the primary object of the present invention is to provide a more energy-efficient method for producing granulated solid carbon dioxide from the solid carbon dioxide (S) particles produced by expanding liquid carbon dioxide (L) and a device for implementing said process.

The technical result of the present invention is expressed in the implementation of a method with a reduced energy consumption for producing granulated solid carbon dioxide from solid carbon dioxide particles and in the implementation of devices based on said method, and is also expressed in implementing a system for the operability of the new device.

Additional objects, advantages and other novel features of the invention will be set forth in part in the description that follows and in part that will become apparent upon examination of the invention.

For the purpose of proving the technical implementation of the apparatus of the present invention, five special technical solutions have been developed based on two methods for converting gas pressure energy into mechanical energy (M) best known to the skilled in the present field of invention, namely, volume displacing gas expanding and flowing gas expanding.

Volume displacing gas expanding includes piston gas expanders (for example U.S. Pat. No. 1,801,700)—the devices configured to convert gas pressure energy into the reciprocating motion of the piston, which is mechanical energy.

Figure 11:
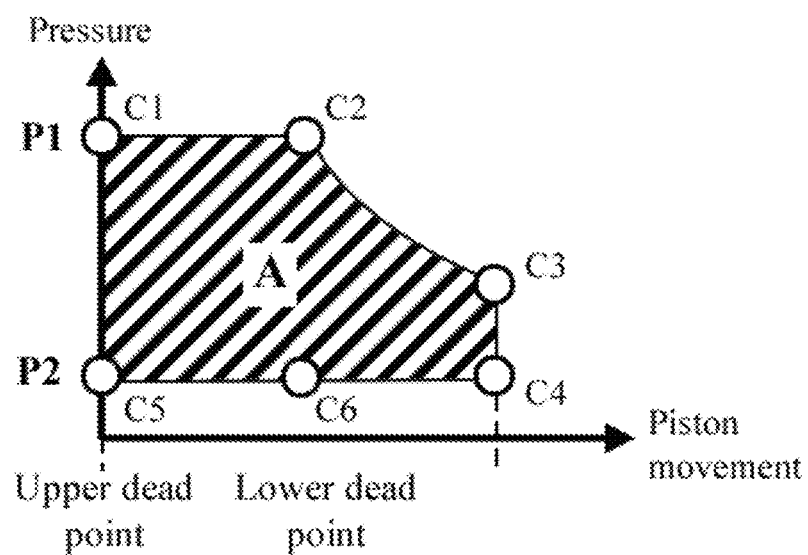
FIG. 11 illustrates an indicator diagram of pressure in the piston expander with the processes of inlet, pressure reduction and gas releasing.

FIG. 11 illustrates a cycle of operation of a piston expander which comprises:
(a) a step of filling the chamber with gas at a constant pressure with a significant amount of produced mechanical energy (M) (C1-C2);
(b) a step of gas pressure reduction in the chamber with a significant amount of produced mechanical energy (M) (C2-C3);
(c) a step of releasing gas from the chamber (C3-C4);
(d) a step of returning the piston to the upper return point via an external force (C4-C5).

The ideal work produced by gas by increasing its amount while reducing its pressure during expansion in a piston expander or turbo expander is identified as isentropic gas expansion work.

Because of the pressure influence on solid carbon dioxide particles that should not decrease during the implementation of the compacting process, it is not possible to connect one piston expander to one pressing block. Since the process C2-C3 (FIG. 11) is capable of producing useful work, it is reasonable to use a multi-row scheme in which at least three piston expanders are connected kinematically to one energy node that can be formed as a crankshaft and which in turn equally distributes mechanical energy (M) over the pressing blocks. The necessary pressure of pressing and extruding in pressing blocks in a multi-row scheme is reached by superimposing of the energy produced in piston expanders in time. Since the multi-row scheme of piston expanders allows to implement a relatively more uniform rotation of the crankshaft, it is reasonable to connect a roller pressing block to the crankshaft.

The following sequence and relation of processes is suitable for volume displacing gas expanding: at the time when the piston of a piston expander or gas cylinder starts moving from the upper return point to the lower return point in the cylindrical pressing block, a process of pressing solid carbon dioxide particles (S) begins, and at the time when the piston comes close the lower return point and the density of packing solid carbon dioxide particles (S) by pressing has reached its maximum in accordance with the structures of the pressing chamber and the die, an extruding process begins.

A special case of a piston expander is a linear gas cylinder (for example U.S. Pat. Nos. 3,650,182, 3,112,670) produced by Airsystempneumatic, SMC, Camozzi, BoschRexroth or some other manufacturer.

Figure 12:
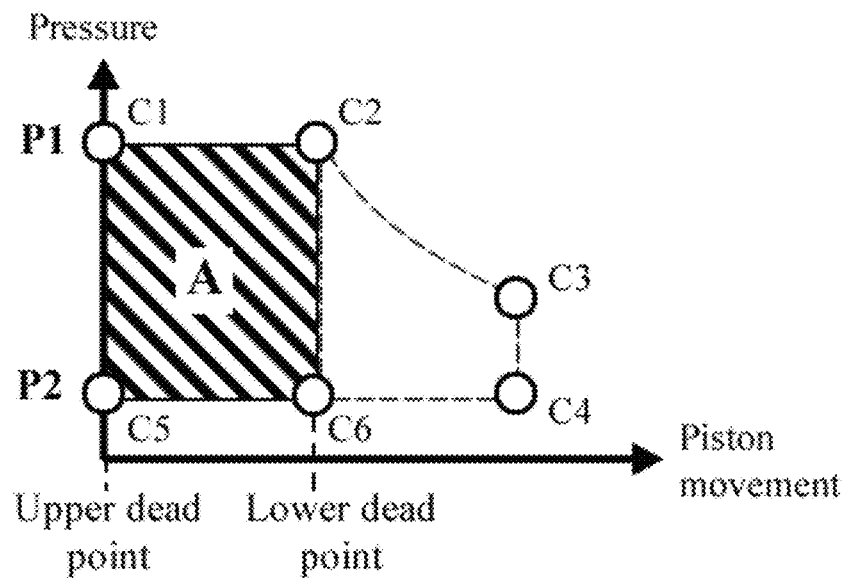
FIG. 12 illustrates an indicator diagram of pressure in a linear gas cylinder with the processes of gas inlet and outlet.

FIG. 12 illustrates a cycle of operation of a linear gas cylinder, which comprises steps of:
(a) filling the chamber with gas at a constant pressure with a significant amount of produced mechanical energy (M) (C1-C2);
(b) releasing gas from the chamber (C2-C6);
(c) returning the piston to the upper return point by means of an external force (C6-C5).

Figure 9:
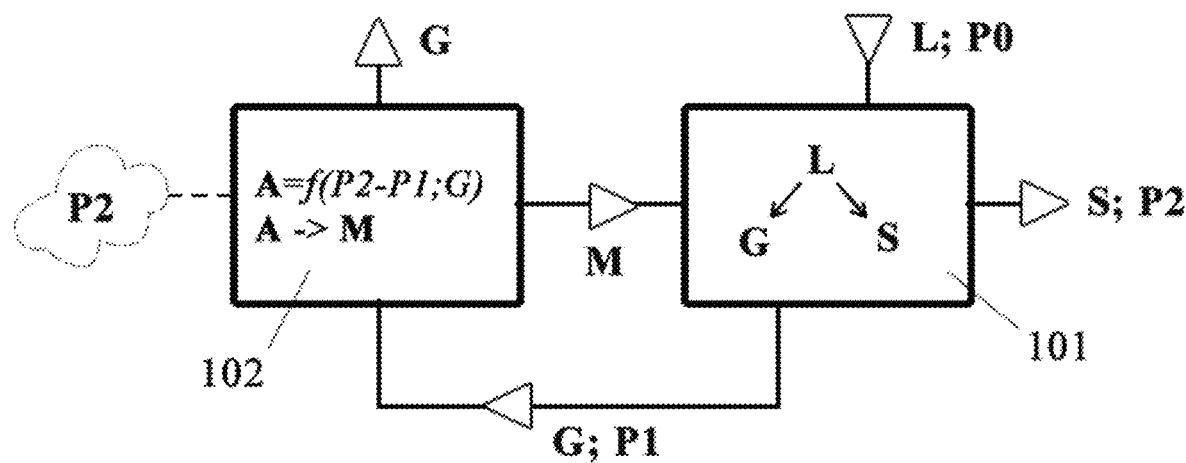
FIG. 9 illustrates a generalized schematic diagram of a device corresponding to claims 1, 4, 7, 10, 13 of the present invention.
Figure 10:
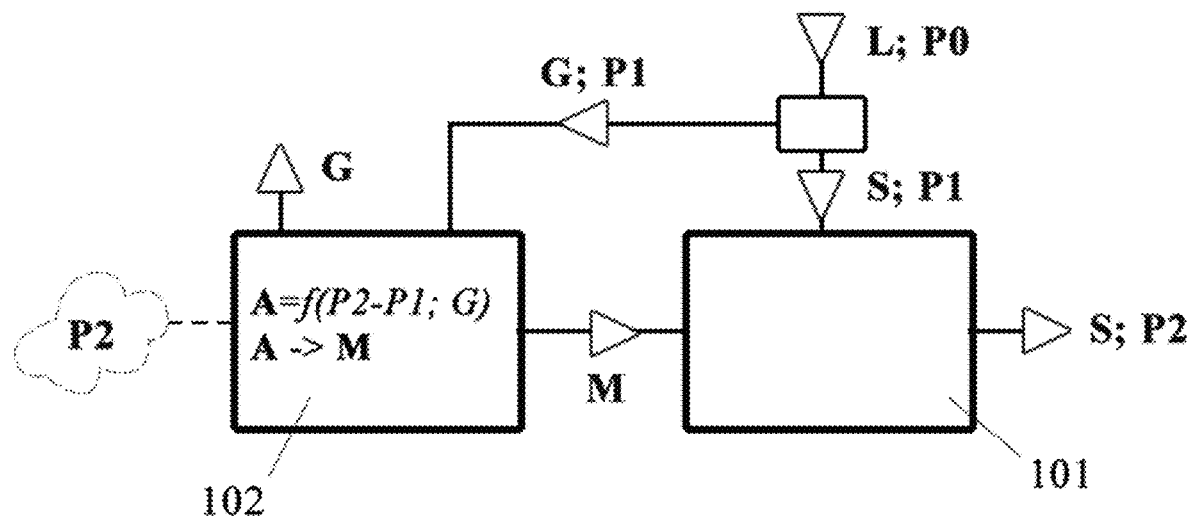
FIG. 10 illustrates a generalized schematic diagram of a device within the scope of the present invention.

The specific work in a linear gas cylinder is less than the specific energy of a piston expander by an amount equal to the area of the C2-C3-C4-C6 contour illustrated in FIG. 9. Because of the pressure in the gas cylinder conventionally remains constant, it is reasonable to connect the gas cylinder directly to a piston-type pressing block.

The ideal work produced by gas by increasing its volume at its constant pressure in the gas cylinder is identified as isobar gas expansion work.

The minimum temperature of the most common types of air cylinders is −20 . . . −30 degrees Celsius, special gas sealings, for example, such as NRI or NRE FlexiSeal® Parker, can be integrated into standard pneumatic cylinders to solve the problem of low operating temperatures.

For a good understanding of the claims of the present invention, the piston expander (306 of FIGS. 17 and 18) and the gas cylinder (306 of FIGS. 15 and 16) are devices of the group of actuators with an external member (308 of FIGS. 15-18) movable in response to said compressed gas (G, FIGS. 15-18) applied on said actuator, wherein the compressed gas (G, FIGS. 15-18) in case of the piston expander (306 of FIGS. 17 and 18) and the gas cylinder (306 of FIGS. 15 and 16) applies on the piston (307 of FIGS. 15-18), thereby urging it to move. In case of the gas cylinder (306 of FIGS. 15 and 16) an external element (308 of FIGS. 15 and 16) is conventionally a gas cylinder bar (308 of FIGS. 15 and 16) connected to a moving piston (307 of FIGS. 15 and 16). An external element (308 of FIGS. 17 and 18) in case of the piston expander (306 of FIGS. 17 and 18) is conventionally a bar (308 of FIGS. 17 and 18) connected to a moving piston (307 of FIGS. 17 and 18).

Devices for flowing gas expanding mainly include turbo expanders (for example U.S. Pat. No. 6,439,836). These devices convert gas pressure energy into the energy of rotation of the blade wheel, which is also mechanical energy. Conventionally, a high-speed shaft of a rotation speed reduction device is connected to the turbo expander in order to increase the torque value. Proceeding from this, the preferred embodiment has been offered, in which the turbo expander is mechanically connected to the roller pressing block via a rotation speed reduction device.

For a good understanding of the claims of the present invention, the turbo expander (306 of FIGS. 19 and 20) is a device of a group of actuators with an external element movable in response to said compressed gas applied to said actuator, where the compressed gas within the turbo expander is applied to the blades of the blade wheel, also configured to move within the turbo expander and connected to an external element, for example, to a shaft, thereby urging the blade wheel and, eventually, the shaft to rotate.

For a good understanding of the claims of the present invention, said single-piston expander, multi-row piston expander, gas cylinder and turbo expander are separately used as the basis for the respective power blocks and actuators.

Figure 1:
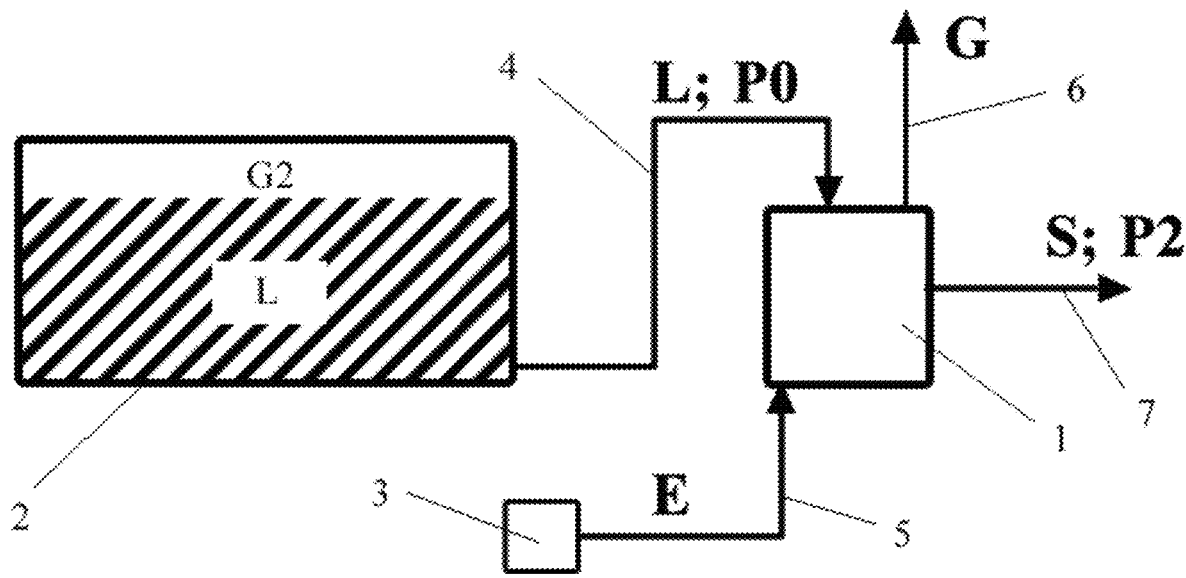
FIG. 1 illustrates a schematic diagram of a prior art system for producing granules from solid carbon dioxide particles.
Figure 2:
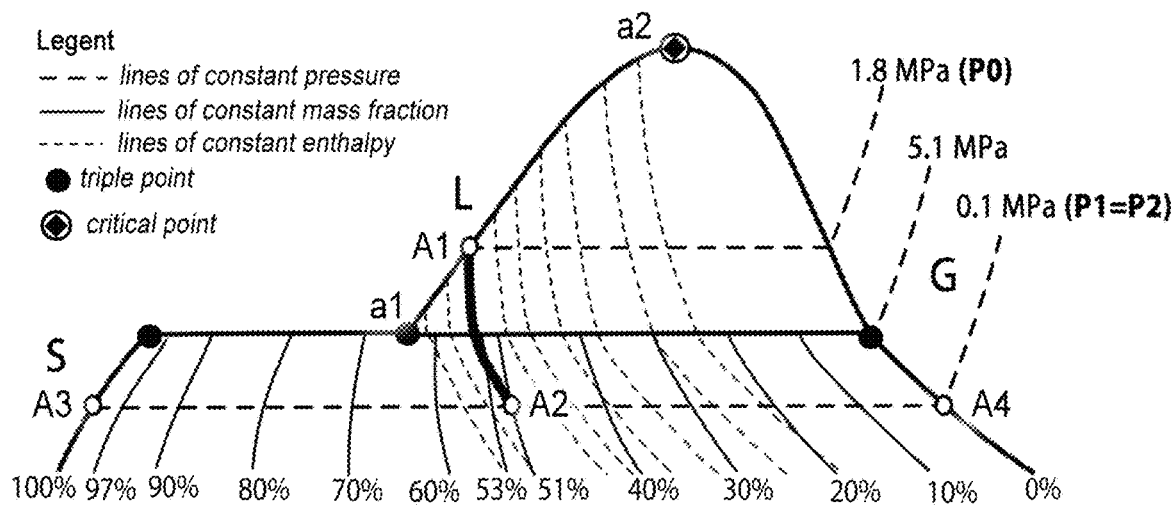
FIG. 2 illustrates the prior art processes marked in a carbon dioxide TS-diagram for producing granules from solid carbon dioxide particles by a sudden reduction of pressure of liquid carbon dioxide to a pressure close to the ambient pressure.
Figure 3:
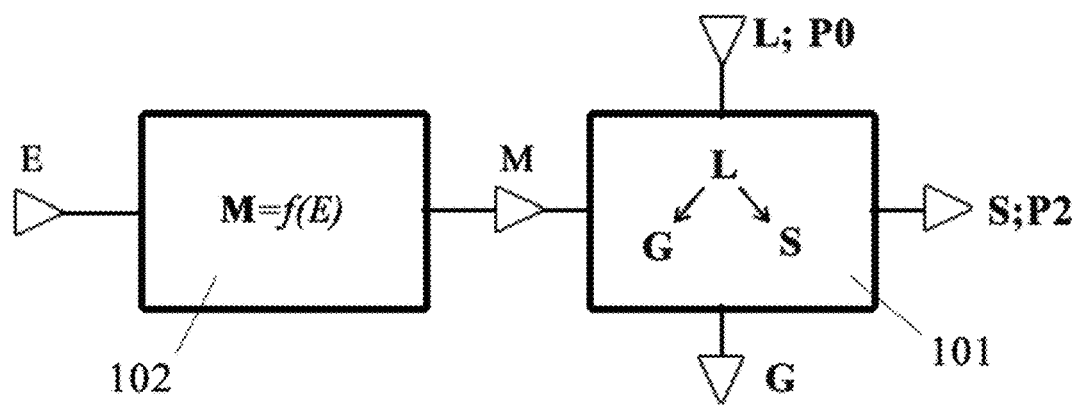
FIG. 3 illustrates a generalized schematic representation of a prior art device for producing solid carbon dioxide granules.
Figure 4:
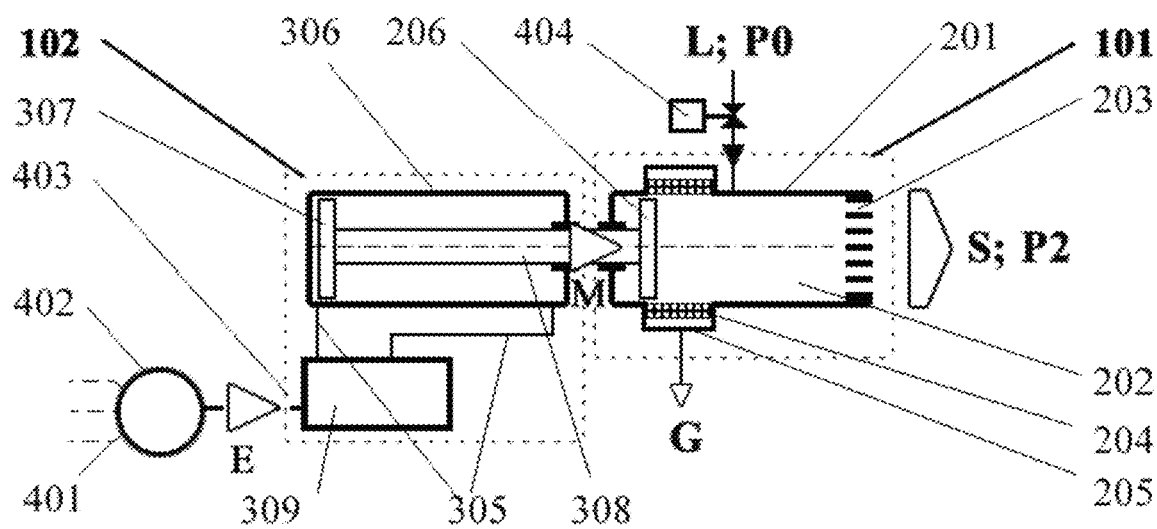
FIG. 4 illustrates a simplified schematic representation of a prior art hydraulic device for producing solid carbon dioxide granules.
Figure 5:
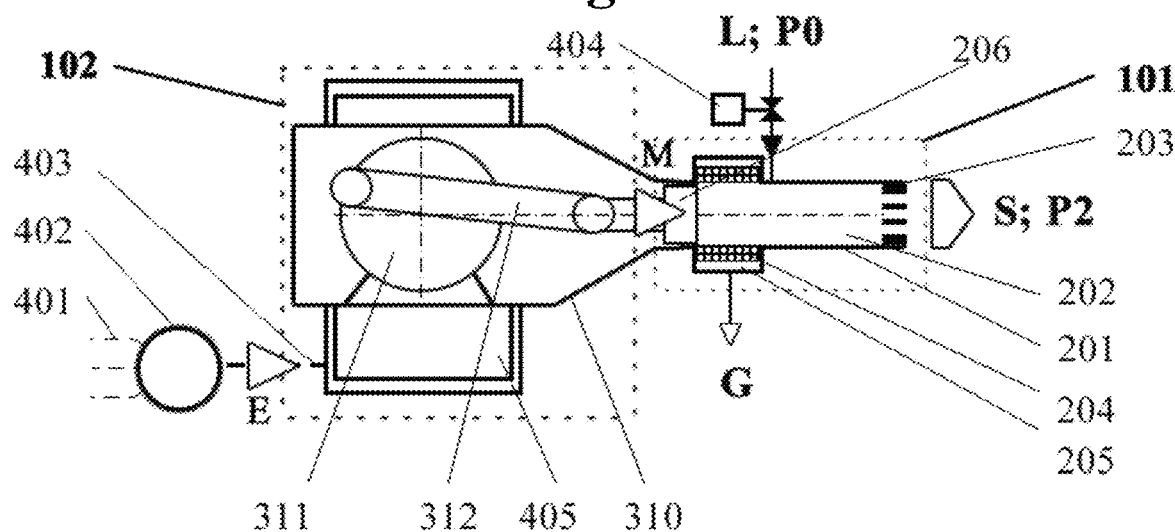
FIG. 5 illustrates a simplified schematic representation of a prior art crank-shaft device for producing solid carbon dioxide granules.
Figure 8:
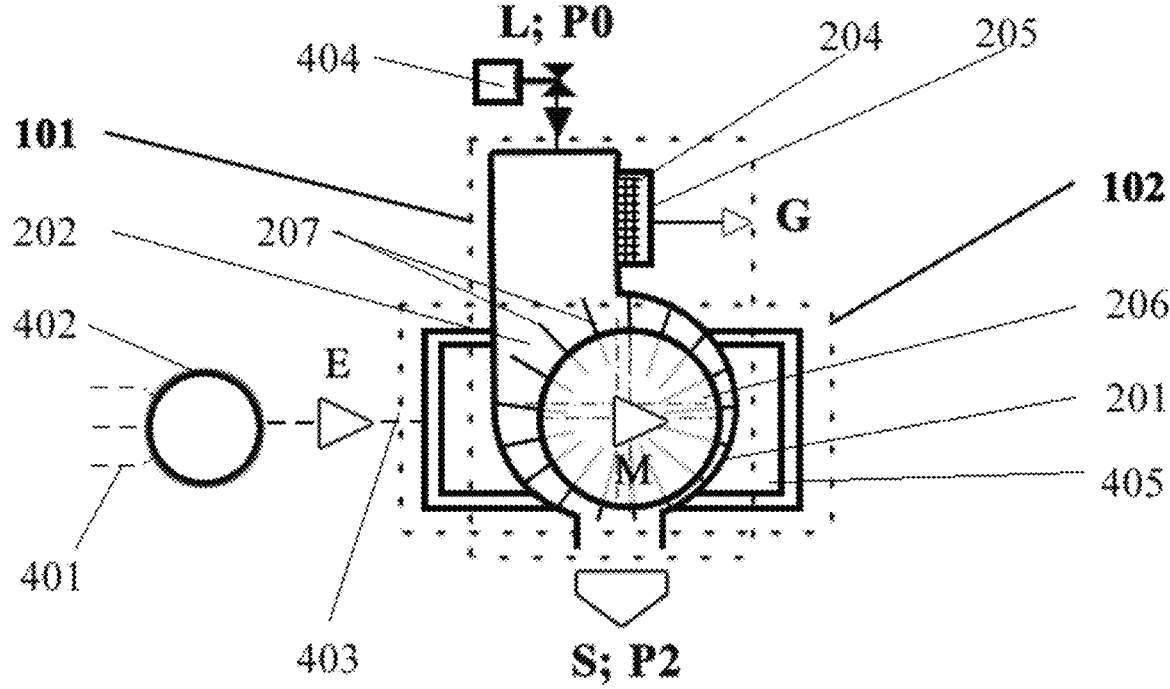
FIG. 8 illustrates a simplified schematic representation of a prior art blade-type device for producing solid carbon dioxide granules.
Figure 13:
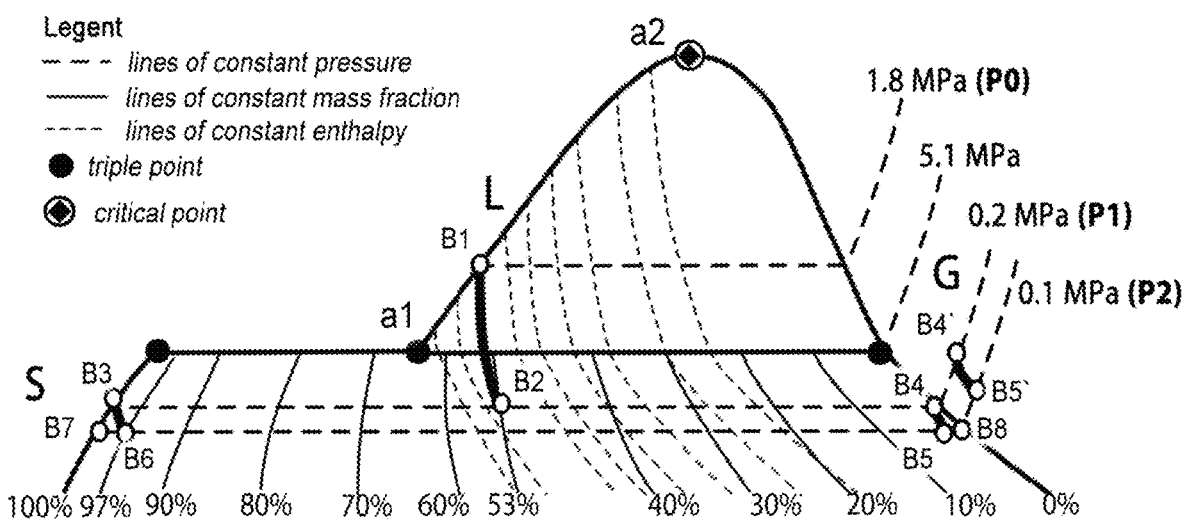
FIG. 13 illustrates the processes of a method of the present invention marked in the carbon dioxide TS-diagram for producing granules from solid carbon dioxide particles by a sudden reduction of pressure of liquid carbon dioxide to a pressure above the ambient pressure and below the carbon dioxide triple point.

FIG. 13 illustrates a TS-diagram and the related processes for a good understanding of a method for producing granulated solid carbon dioxide (S) within the scope of the present invention. Point B1, disposed on the saturation line a1-a2, characterizes the state of carbon dioxide in a liquid aggregate state (L) when being stored in a tank at a pressure, for example, 1.8 MPa. Line B1-B2 characterizes the process of a sudden reduction of pressure of liquid carbon dioxide (L) from point B1 to point B2, which describes the process of receiving of liquid carbon dioxide (L) by a chamber and the process of converting liquid carbon dioxide (L) into compressed gaseous carbon dioxide G) and solid carbon dioxide particles (S) in the claims of the invention. Point B2 illustrates the thermodynamics equilibrium of a mixture of solid carbon dioxide (S) at a pressure of 0.2 MPa (point B3) and gaseous carbon dioxide at a pressure of 0.2 MPa (point B4), based on which it is possible to calculate the fraction of produced solid carbon dioxide, which is equal to the result of dividing the value of the length of B2-B4 segment by the value of the length of B3-B4 segment and is approximately 0.53 (53%). The obtained value of the fraction of the produced solid carbon dioxide is higher, since Point B2 in this diagram is higher than Point A2 in the diagram of FIG. 2. Further on, gaseous carbon dioxide without heating (point B4) or with heating (point B4') to exclude the production of solid carbon dioxide particles in the actuator is transferred into the power block. In the power block the energy of the compressed gaseous carbon dioxide is converted into mechanical energy (line B4-B5 or B4'-B5'). Point B5 and point B5' correspond to the used carbon dioxide gas at a pressure, for example, of 0.101 MPa. Further on, at Point B3, the solid carbon dioxide particles (S) are pressed by the first portion of the mechanical energy (M) generated in the power block or by the movement of the pressing member. Line B3-B6 characterizes the process of reduction of pressure of the extruded compacted solid carbon dioxide particles (S) from the die, which is implemented by the impact of the second fraction of the mechanical energy (M) generated in the power block or by the same movement of the pressing member. The processes of pressing and extruding do not have an exact time boundary between themselves, therefore, as in most of said patents, the processes are combined: mechanical energy (M) is assigned to compact solid carbon dioxide particles (S) or assigned to extrude solid carbon dioxide particles (S), because of extrusion is always accompanied by pre-pressing to a density necessary for extruding at a suitable pressing pressure; or the movement of the pressing member is assigned to compact solid carbon dioxide particles (S) or assigned to extrude solid carbon dioxide particles (S). After the extrusion process B3-B6, solid carbon dioxide loses 3% of its mass, which does not significantly affect the total fraction of solid carbon dioxide which is equal to 0.51 and obtained by multiplying 0.53 by 0.97. Thus, the total fraction of solid carbon dioxide in the current production process is equal to the fraction in a conventional ideal production process. The energy produced by the gaseous carbon dioxide in the expander can be increased by heating cold gaseous carbon dioxide from the ambient environment before being supplied to the expander.

It should be noted that solid carbon dioxide particles (S) can be pressed and extruded at the atmospheric pressure while being within the pressing block in case when after the outflow of gaseous carbon dioxide (G) under the intermediate pressure (P1) or solid carbon dioxide particles (S) will be moved to the pressing block at the atmospheric pressure (FIG. 9, 10) or the pressure in the pressing block will be reduced from the intermediate (P1) to the atmospheric (FIG. 9).

Figure 14:
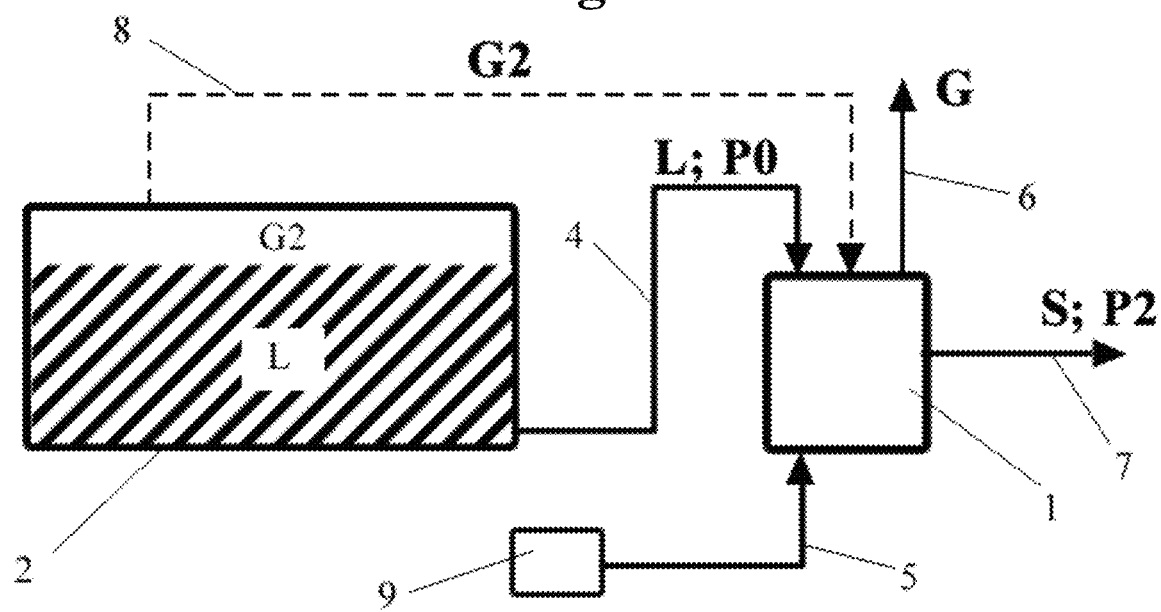
FIG. 14 illustrates a schematic diagram of a system for producing granules from solid carbon dioxide particles within the scope of the present invention.

FIG. 14 illustrates a schematic diagram of a system for producing granules from solid carbon dioxide particles of the present invention. The apparatus for producing granules from solid carbon dioxide particles 1 of the present invention is connected to the tank 2 for storing liquid carbon dioxide (L) through the line 4 configured to supply liquid carbon dioxide from the tank 2 to the apparatus 1. The apparatus 1 of the present invention consumes electricity from an external power source 9 for the operation of the following units of apparatus 1: a control system (PLC programmable logic controllers, microelectronics, valves, sensors, auxiliary actuators, etc.); a system for heating separate structural elements and other units that are not configured to apply mechanical energy to solid carbon dioxide particles for their compaction. Based on the design features of the apparatus of the present invention, there may be two ways to start them. The first method is without the use of the primary gaseous carbon dioxide (G2), the second method provides its use. In case of the first method, before the apparatus 1 reach the stationary mode of operation and during the stationary mode of operation, the mass balance of the apparatus 1 should correspond to the formula L=G+S, where L is the mass flow rate of liquid carbon dioxide (L), G is the mass flow of gaseous carbon dioxide (G) and S is the mass flow rate of solid carbon dioxide (S). In case of the second method, before the apparatus 1 reach the stationary mode of operation, the mass balance of the apparatus 1 should correspond to the formula L+G2=G+S+G2, where G2 is the mass flow of the primary gaseous carbon dioxide (G2) taking from the tank 2. The primary gaseous carbon dioxide flow (G2) can be created by the release of the saturated steam above the mirror of liquid carbon dioxide (L) in the tank 1, or by the gasification of liquid carbon dioxide (L) via external heat sources.

The phrase "at least a gas portion" and "at least a part of the mass of particles" in the claims of the present invention is used, for example, to indicate a partial use of the base mass flows of gaseous carbon dioxide (G) and solid carbon dioxide particles (S) indicated in the claims of the present invention: an insignificant part of solid carbon dioxide particles (S) conventionally passes through the filtering element; an insignificant part of carbon dioxide gas, which is under pressure in the pressing block, conventionally leaks into the environment. The phrase "is at least partially converted" and "is at least partially transferred" in the claims of the present invention is used to take into account, for example, the efficiency of mechanical operations. The above phrases, also said in the claims of the present invention, are not limited to said examples in the semantic content.

The apparatus of the present invention can be embodied in such a way that compacting can be implemented in at least two pressing chambers, such as in the U.S. Pat. Nos. 5,458,960 and 5,419,138.

Figure 20:
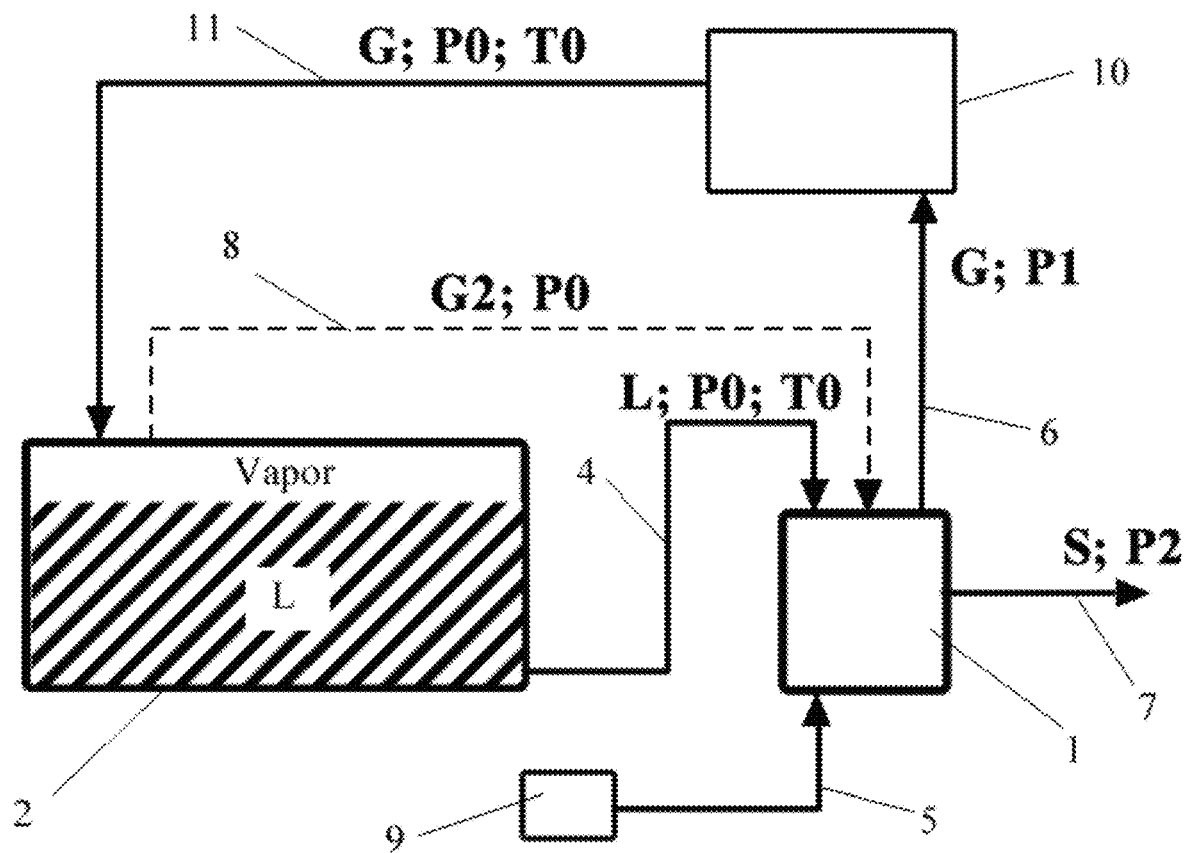
FIG. 20 illustrates a schematic diagram of a system for producing granules from solid carbon dioxide particles with the recovery of gaseous carbon dioxide within the scope of the present invention.

FIG. 20 illustrates a schematic diagram of a system for producing granules from solid carbon dioxide particles with the recovery of gaseous carbon dioxide in the scope of the present invention.

The conversion unit of the present invention can be a chamber in which liquid carbon dioxide expands to a pressure below the pressure of the triple point of carbon dioxide, or several chambers for multi-step expanding.

The mass flows of the compressed gaseous carbon dioxide may be in contact with other external flows, for example, with liquid carbon dioxide.

A chamber in which solid carbon dioxide particles are compressed can be a pre-compressing chamber, after which another chamber with a hydraulic or other actuator capable to compress particles stronger will be installed.

An important point in the production of granulated solid carbon dioxide is compression pressure and extrusion pressure. For example, U.S. Pat. No. 5,419,138 (col. 12, line 63) states that a pressure of 2200 psi (about 15 MPa) is sufficient to produce granules for cooling purposes, and a pressure of 3200 psi (22 MPa) is sufficient to produce granules for blast cleaning; it is known from the experience of Russian engineers (Paragraph 5 of RU2350557) that to remove light contaminants, "soft" granules are also required, and in some cases large pieces of pressed solid carbon dioxide (not fine granules) for blast cleaning via a scraping device produced by ColdJet (WO2013116710A1) can be used. It is necessary to understand that the maximum pressure value does exist and this value is primarily physically limited by the ratio of the amount of gaseous carbon dioxide and the amount of the solid carbon dioxide particles produced after a sudden expansion of liquid carbon dioxide. When, unlike analogs, it is possible to supply with any amount of external energy to extrude a certain amount of solid carbon dioxide particles. The first additional technical result is the ability of the apparatus of the present invention to create the necessary pressure when pressing solid carbon dioxide particles to form a block (of a granulated form) of solid carbon dioxide with a density higher than the density of packing of particles in the pressing block chamber after expanding liquid carbon dioxide, the values of which range from 521 to 850 kg/m3 (U.S. Pat. Nos. 4,374,658A and 5,845,516). The density of the produced compressed gaseous carbon dioxide is within the range of 3.85-14.3 kg/m3 at the corresponding pressure of 0.15-0.5 MPa. For example, in accordance with preferred embodiment No. 1, in case of the equal length of a cylindrical chamber and gas cylinder, the ratio of the cross section of the cylinder filled with the produced gas to the cross section of the chamber filled with the produced particles is approximately 36-220, and the compression pressure for the whole theoretical movement of pressing member of the apparatus at said gas pressure is 18-33 MPa, because such pressure is provided for the whole movement of pressing member, the compression pressure is sufficient, according to the above data, for extruding through a member for extruding at least one granule, which is the second additional technical result. Similar relationships can also be calculated for roller pressing chambers. For expander (piston or turbo expander) power blocks the theoretical values of the pressure of compressing and extruding will be higher in accordance with FIG. 11-12. It should be understood that it is possible to create technically a member for extruding with any hydraulic resistance value (extruding resistance), as with a high value that will not allow to extrude granules, and as with a low value that will not hold the pressure in the pressing chamber. Thus, in order to implement the extruding of solid carbon dioxide particles (S), it is necessary, in addition to pressing, to select such a combination of density of packing of solid carbon dioxide particles (S) in the pressing block chamber after a sudden expansion of liquid carbon dioxide (L) and the geometry of a member for extruding in order to the minimum value of mechanical energy (M) generated by compressed gaseous carbon dioxide (G) in the pressing block (actuator), or the minimum path of movement of the pressing member actuated by a power block (actuator) on the consumption (impact) of the compressed carbon dioxide should provide (a combination of density and geometry) the necessary pressure applied to the solid carbon dioxide particles in the chamber for extruding them through a member for extruding, and the geometry of the member for extruding should provide the production of compressed carbon dioxide in case of the expansion of liquid carbon dioxide at a relative working pressure. Above this, in order to increase the extruding rate or to increase extruding pressure, it is reasonable to select such a member for extruding that has smallest of all possible variants of hydraulic resistance, namely has a geometry of truncated cone or one narrowing hole, which will also allow to produce solid carbon dioxide granule (S).

DETAILED DESCRIPTION OF THE PREFERRED EMBODIMENT

FIGS. 15-19 illustrate a simplified schematic representation of specially developed embodiment for implementing the methods of the present invention for producing solid carbon dioxide granules. The apparatus has similar structure and comprises at least one pressing block 101 and at least one power block 102. The pressing block 101 can be presented in the form of piston-type or roller-type or another type if the structure of this chamber is provided for compacting, pressing and extruding solid carbon dioxide particles. The power block 102 can be represented as a piston expander or turbo expander, or as another device configured to convert the energy of pressure of gaseous carbon dioxide into the mechanical energy that applied on pressing block 101.

Figure 15:
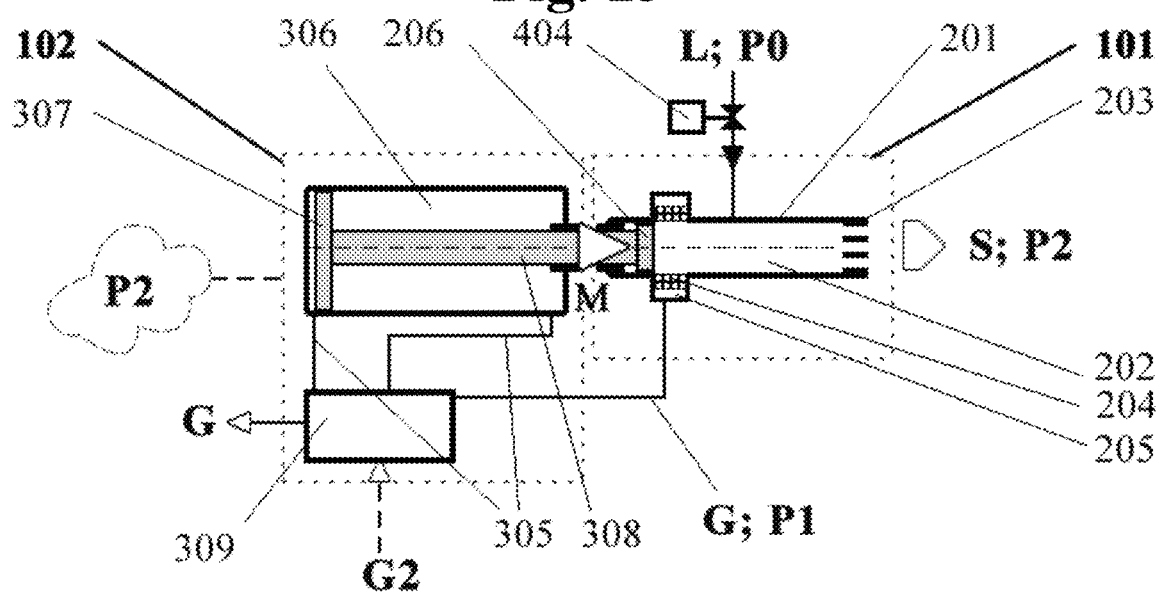
FIG. 15 illustrates a simplified schematic representation of preferred embodiment No 1.

FIG. 15 illustrates a simplified schematic diagram of a apparatus based on a single line gas cylinder, which is preferred embodiment No. 1. The apparatus comprises one piston pressing block 101 and a power block 102 based on a gas line cylinder 306. The pressing block 101 comprises a case 201 with an inner chamber 202 of a cylindrical form, a extruding member 203 disposed in the case 201 at one end and a pressing member 206 disposed within the chamber 202, terminates the chamber 202 from the second end, the filtering element 204 formed in the case 201 connects the interior of the chamber 202 to the collecting device 205. The valve 404 is configured to supply liquid dioxide carbon into the chamber 202. The power block 102 comprises a gas line cylinder 306 working on gaseous carbon dioxide (G), the flow of which is controlled by the control unit 309. Supplying of gaseous carbon dioxide (G) into the gas cylinder 306 and releasing of gaseous carbon dioxide (G) from the gas cylinder 306 are performed via gas connections 305. Gaseous carbon dioxide (G) is supplied to the control unit 309 by an outflow of gaseous carbon dioxide (G) from the pressing block 101 through the collecting device 205. The pressing block 101 and the cylinder 306 are configured to hold the intermediate pressure (P1) of gaseous carbon dioxide (G) within itself. The control unit 309 comprises a PLC system, a gas valve control system and a gas buffer for intermediate storage of gaseous carbon dioxide (G). The inner movable piston 307 disposed within the gas cylinder 306 gas-proof divides inner volume of the gas cylinder 306 in two parts, the amount of which can vary depending on the position of the inner movable piston 307 in the gas cylinder 306. The linear force from the power block 102 is transferred to the pressing block 101 by filling that part of the interior of the gas cylinder 306 by carbon dioxide gas (G) which is disposed within the other side of the pressing block relative to the inner movable piston 307. The intermediate pressure (P1) of the carbon dioxide gas (G) is applied to the surface of the inner movable piston 307 and thereby a force is created and transmitted through the bar 308 to the pressing member 206. The apparatus is only capable of producing compacted solid carbon dioxide (S) intermittently, since it takes time to return the pressing member 206 to the reverse position to fill the chamber 202 by solid carbon dioxide particles.

Figure 16:
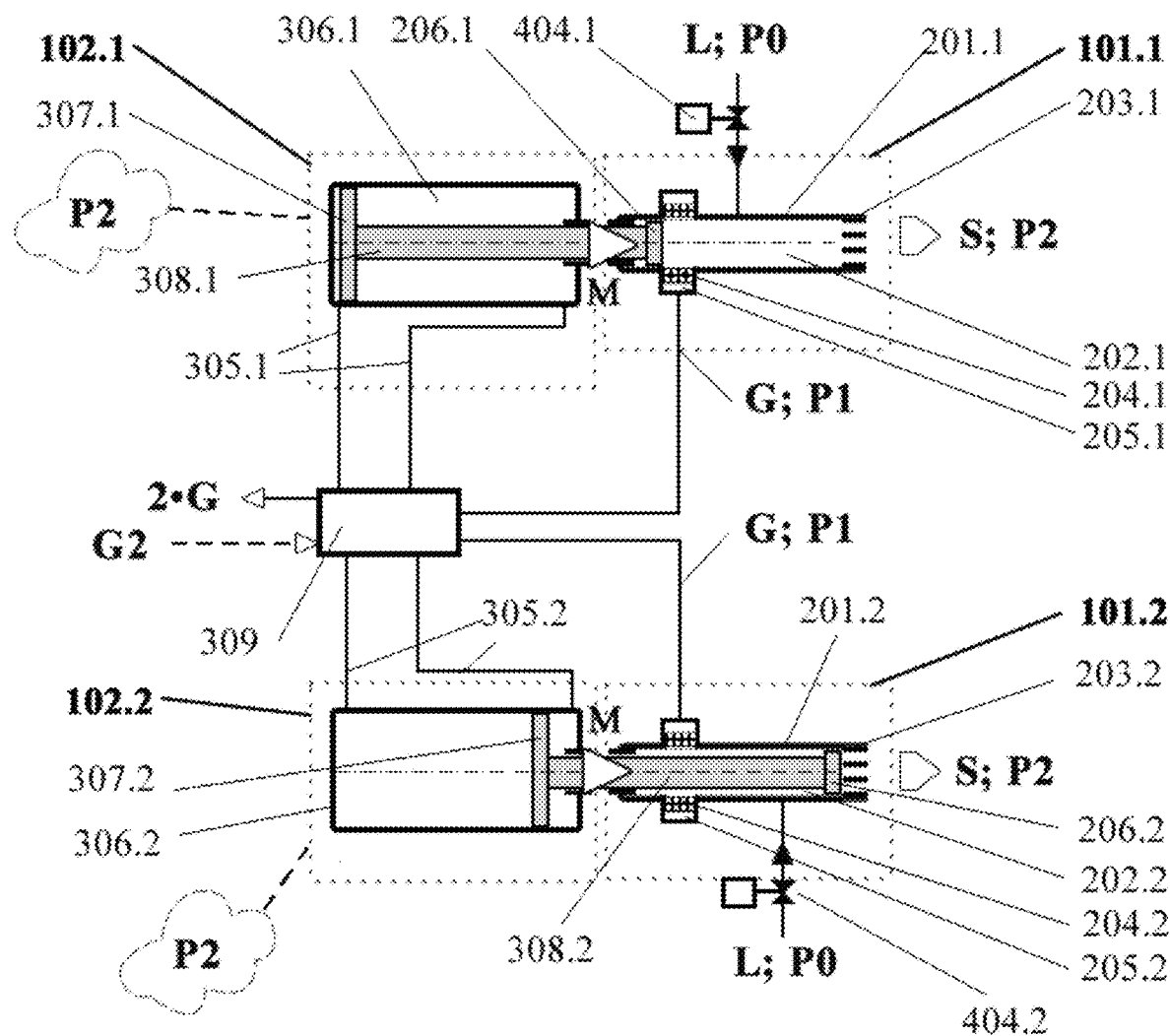
FIG. 16 illustrates a simplified schematic representation of preferred embodiment No 2.

FIG. 16 illustrates a simplified schematic diagram of a device based on two gas line cylinders, which is preferred embodiment No. 2. The device comprises two piston pressing blocks 101.1 and 101.2 and two power blocks 102.1 and 102.1, respectively, based on gas line cylinders 306.1 and 306.2, respectively. The pressing blocks 101.1 and 102 comprise a cases 201.1 and 201.2, respectively, with inner chambers 202.1 and 202.1 of a cylindrical form, where the extruding members 203.1 and 203.2 are disposed to each case 201.1 and 201.2 at one end, respectively, and the pressing members 206.1 and 206.2 disposed within the chambers 202.1 and 202.2, respectively, terminate each chamber 202.1 and 202.2 from the second end, the filtering elements 204.1 and 204.2 formed in each case 201.1 and 201.2, respectively, interiors of each chamber 202.1 and 202.2 connect to the collecting devices 205.1 and 205.2, respectively. The valves 404.1 and 404.2 are configured to supply separately liquid carbon dioxide to the chambers 202.1 and 202.2, respectively. Each power block 102.1 and 102.2 comprises a gas line cylinder 306.1 and 306.2, respectively, working via gaseous carbon dioxide, the flow of which is controlled by the control units 309. Supplying of gaseous carbon dioxide (G) into the gas cylinders 306.1 and 306.2 and releasing of gaseous carbon dioxide (G) from the gas cylinders 306.1 and 306.2 is performed via gas connections 305.1 and 305.2. Gaseous carbon dioxide (G) is supplied to the power block 309 at the intermediate pressure (P1) by an outflow of gaseous carbon dioxide (G) at the intermediate pressure (P1) from the pressing blocks 101.1 and 101.2 through the collecting devices 205.1 and 205.2. The gas cylinders 306.1 and 306.2 and the pressing blocks 101.1 and 101.2 are configured to hold the pressure of gaseous carbon dioxide (G) at the intermediate pressure (P1) within itself. The control unit 309 comprises a PLC system and a gas valve control system. The inner movable pistons 307.1 and 307.2 disposed in the gas cylinders 306.1 and 306.2, respectively, gas-proof divide the interior of the gas cylinders 306.1 and 306.2 into two parts, the volume of which may vary depending on the position of the inner movable pistons 307.1 and 307.2 in the gas cylinders 306.1 and 306.2. The forces from the power blocks 102.1 and 102.2 are transferred to the pressing blocks 101.1 and 101.2 by filling the part of the interiors of the gas cylinders 306.1 and 306.2 with gaseous carbon dioxide (G) that are disposed on the other side of the pressing blocks 101.1 and 101.2 relative to the inner movable piston 307.1 and 307.2. The pressure of gaseous carbon dioxide (G) is applied to the surface of the inner movable pistons 307.1 and 307.2 and thereby forces are created and transferred alternately through the bars 308.1 and 308.2 to the pressing members 206.1 and 206.2. Gaseous carbon dioxide (G) is supplied crosswise at the intermediate pressure (P1), i.e., while a sudden reduction of pressure of liquid carbon dioxide (L) and the production of gaseous carbon dioxide (G) at the intermediate pressure (P1) occur in one pressing block 101.1 or 101.2, the solid carbon dioxide (S) particles are compacted in the other pressing block 101.2 or 101.1 by supplying gaseous carbon dioxide (G) at the intermediate pressure (P1) to the power block 102.2 or 102.1, respectively, from the pressing block 101.1 or 101.2.

Figure 17:
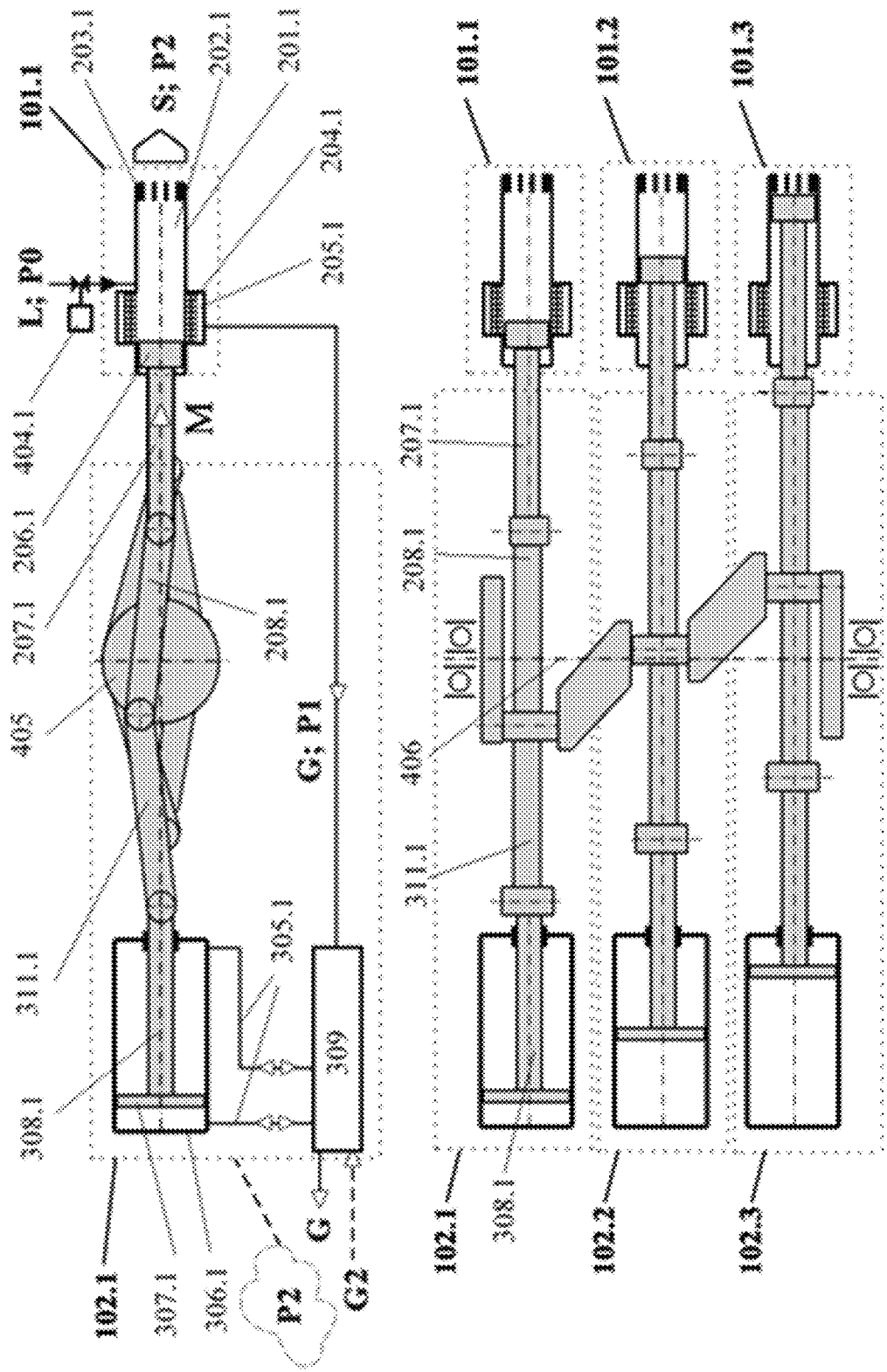
FIG. 17 illustrates a simplified schematic representation of preferred embodiment No 3.

FIG. 17 illustrates a simplified schematic representation of a crank-shaft apparatus based on a multi-row piston expander, which is preferred embodiment No. 3. The device comprises at least three piston pressing blocks 101.1, 101.2 and 101.3, as a same amount of power blocks 102.1, 102.2 and 102.3 based on gas piston expanders 306.1, 306.2 and 306.3, all the pressing blocks 101.1, 101.2 and 101.3 and all the power blocks 102.1, 102.2 and 102.3 are connected to each other via a crankshaft 405 that has a fixed axis 406 and cranks 311.1, 311.2, 311.3, 208.1, 208.2 and 208.3. The pressing blocks 101.1, 101.2, 101.3 comprise bodies 201.1, 201.2 and 201.3, respectively, with inner chambers 202.1, 202.1 and 202.3 of a cylindrical form, where the extruding members 203.1, 203.2 and 203.3 disposed to each case 201.1, 201.2 and 201.3 from one end, respectively, and the pressing members 206.1, 206.2 and 206.3 disposed within the chambers 202.1, 202.2 and 202.3, respectively, terminate the corresponding chamber 202.1, 202.2 and 202.3 from the second end, the filtering elements 204.1, 204.2 and 204.3 formed in each case 201.1, 201.2 and 201.3, respectively, connect the interiors of the corresponding chamber 202.1, 202.2 and 202.3 with the corresponding collecting devices 205.1, 205.2 and 205.3. The valves 404.1, 404.2 and 404.3 are configured to supply separately liquid carbon dioxide (L) to the chambers 202.1, 202.2 and 202.3, respectively. The mechanical energy (M) is produced in the power block 102.1, 102.2 and 102.3 by supplying the piston expanders 306.1, 306.2 and 306.3 with gaseous carbon dioxide (G) at the intermediate pressure (P1) by means of the control unit 309 with an equal time difference between the piston expanders. Gaseous carbon dioxide (G) at the intermediate pressure (P1) is applied to the working surface of the internal movable pistons 307.1, 307.2 and 307.3 and thereby forces are created and transferred alternately through the bars 308.1, 308.2 and 308.2 and through the cranks 311.1, 311.2 and 311.3 to the crankshaft 405, which in turn transfers the same mechanical energy (M) via the cranks 208.1, 208.2 and 208.3 and the bars 207.1, 207.2 and 207.3 to the pressing members 206.1, 206.2 and 206.3 with an equal time difference between the pressing blocks 101.1, 101.2 and 101.3. The control unit 309 comprises a PLC system and a gas valve control system.

Figure 18:
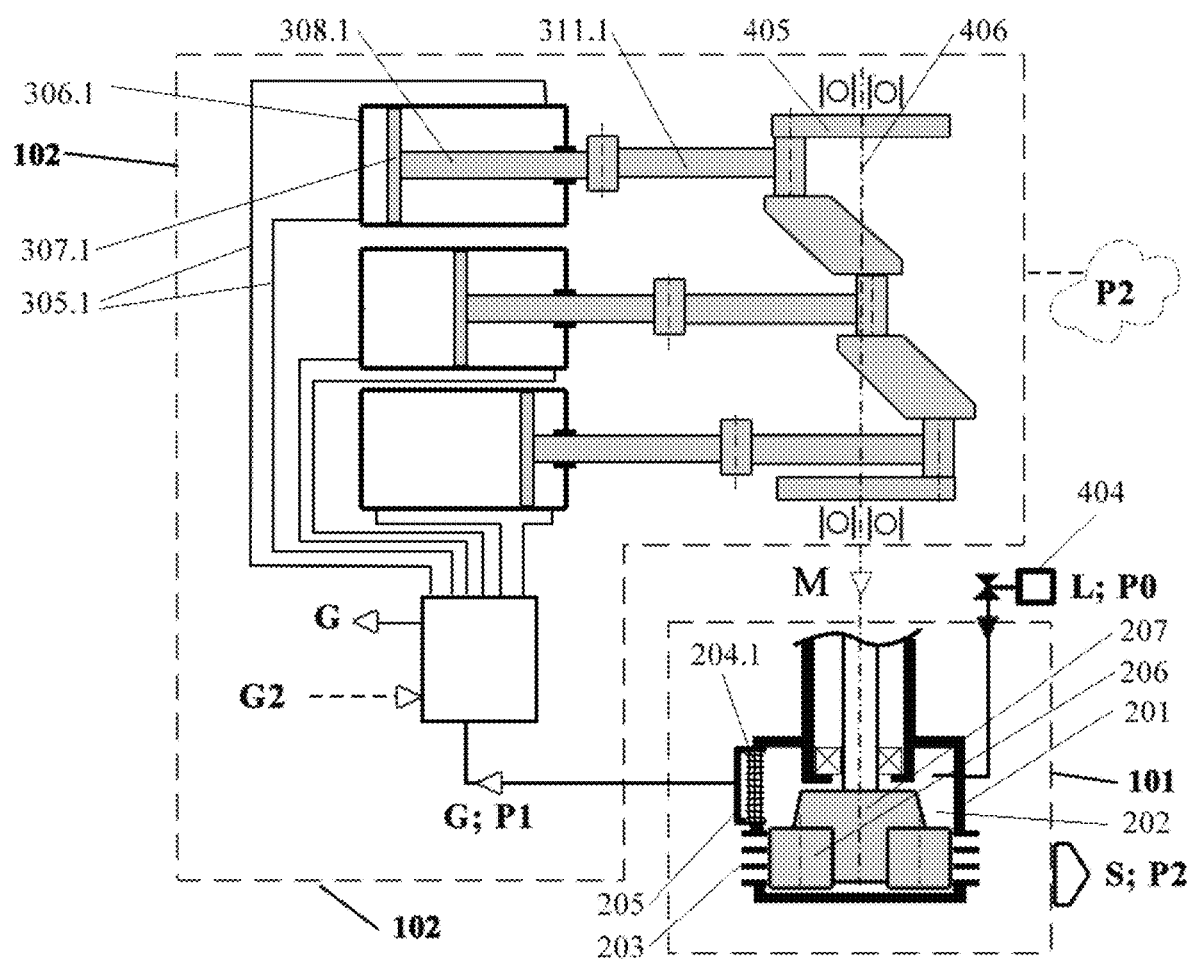
FIG. 18 illustrates a simplified schematic representation of preferred embodiment No 4.

FIG. 18 illustrates a simplified schematic diagram of a roller apparatus based on a multi-row piston expander which is preferred embodiment No. 4. The apparatus comprises a roller pressing block 101 and a power block 102 based on a multi-row piston expander. If necessary, a speed reduction device may be included in the power block 102. The roller pressing block 101 comprises a cylindrical pressing chamber 201 an annular extruding die 203 is formed in. Within the cylindrical pressing chamber 201 there are pressing members 206 that roll on the inner surface of the annular extruding die 203 and rotate around an axis that coincides with the axis of the cylindrical pressing chamber 201. A collecting device 205 is formed in the case of the pressing chamber 201, so that the interior of the pressing chamber 201 is connected to the interior of the collecting device 205 via a filtering element 204 to hold the solid carbon dioxide (S) particles produced by a sudden reduction of pressure of the liquid carbon dioxide (L) supplied to the pressing chamber 202 through the valve 404. The gaseous carbon dioxide (G) at the intermediate pressure (P1) produced by a sudden reduction of pressure of liquid carbon dioxide, is supplied through the gas channels 305 into the piston expanders 306.

Figure 19:
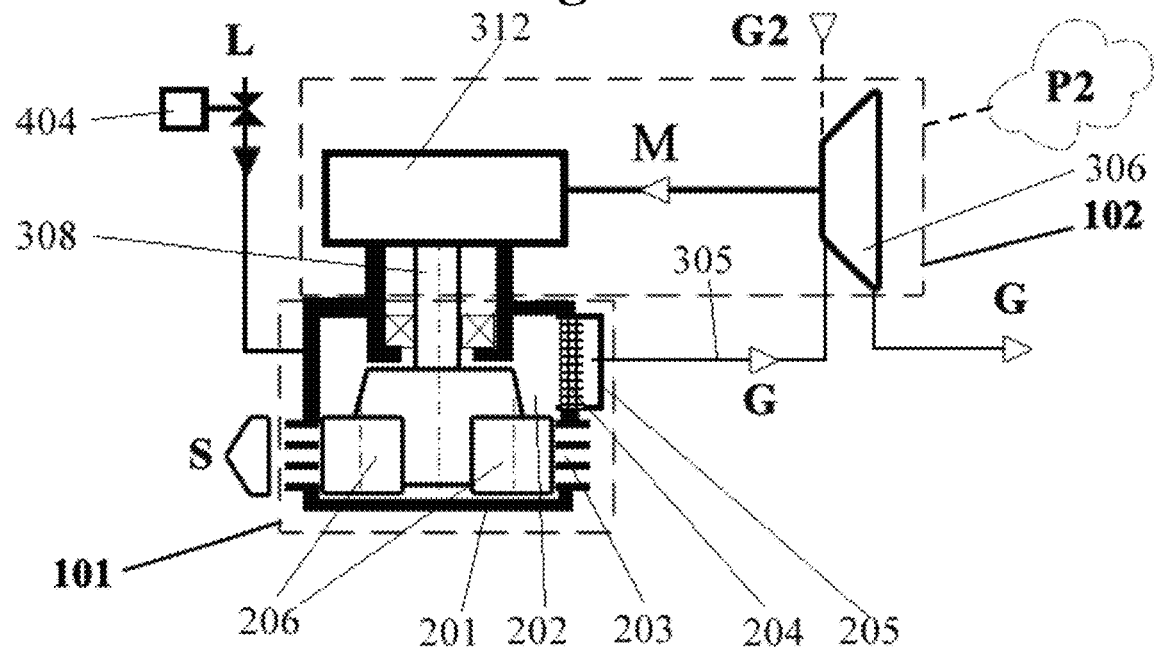
FIG. 19 illustrates a simplified schematic representation of preferred embodiment No 5.

FIG. 19 illustrates a simplified schematic representation of a roller device based on a turbo expander which is preferred embodiment No. 5. The device comprises a roller pressing block 101 and a power block 102 based on a turbo expander 306. The roller pressing block 101 comprises a cylindrical pressing chamber 201 an annular extruding die 203 is coaxially formed in. Within the cylindrical pressing chamber 201 there are pressing members 206 that roll on the inner surface of the annular extruding die 203 and rotate around an axis that coincides with the axis of the cylindrical pressing chamber 201. A collecting device 205 is formed in the case of the pressing chamber 201, so that the interior of the pressing chamber 201 is connected to the interior of the collecting device 205 via a filtering member 204 to hold the solid carbon dioxide (S) particles produced by a sudden reduction of pressure of the liquid carbon dioxide (L) supplied to the pressing chamber 202 through the device 404. The gaseous carbon dioxide (G) at the intermediate pressure (P1) produced by a sudden reduction of pressure of liquid carbon dioxide, is supplied into the turbo expander 306 through the gas channel 305. The mechanical energy (M) produced by the turbo expander 306 is transferred to the pressing block 101 through a rotation speed reduction device 312.

Abbreviations

Line is a text line in the patent; col. is a text column in the patent; claim is a formula claim in the patent; paragraph is a text paragraph in the patent; in Eng. is in English.

I claim:

1. An apparatus, comprising:
   at least one pressing block configured to receive liquid carbon dioxide and convert said liquid carbon dioxide into compressed gaseous carbon dioxide and solid carbon dioxide particles within said pressing block, said pressing block being configured to supply an outflow of said compressed gaseous carbon dioxide and to receive mechanical energy to apply to a first pressing member disposed in said pressing block to press said solid carbon dioxide particles; and
   for each at least one pressing block, a power block configured to receive compressed gaseous carbon dioxide from said outflow and convert pressure energy of at least part of said outflow into said mechanical energy received by said pressing block.

2. The apparatus of claim 1, wherein each at least one pressing block includes a chamber provided with at least one valve configured to receive said liquid carbon dioxide and convert said liquid carbon dioxide into said compressed gaseous carbon dioxide and said solid carbon dioxide particles.

3. The apparatus of claim 2, wherein: said power block is provided with at least one gas cylinder; each said gas cylinder includes a second pressing member and a sealing of said second pressing member; said sealing contacts with said compressed gaseous carbon dioxide and remains operable at a temperature of said compressed gaseous carbon dioxide; and said mechanical energy is transmitted by said second pressing member to said pressing block.

4. The apparatus of claim 3, wherein said second pressing member is connected to a crankshaft, said crankshaft transmitting said mechanical energy to said pressing block.

5. The apparatus of claim 2, wherein: each at least one pressing block comprises a first pressing block and a second pressing block; said outflow includes a first outflow from said first pressing block and a second outflow from said second pressing block connected to form a third outflow; said power block for each at least one pressing block includes a first power block associated with the first pressing block and a second power block associated with the second pressing block; and said third outflow is provided to the first power block and to the second power block.

6. The apparatus of claim 1, wherein each at least one pressing block applies said mechanical energy to said first pressing member to press said solid carbon dioxide particles into solid carbon dioxide granules packed more densely than said solid carbon dioxide particles.

7. An apparatus, comprising:
   at least one pressing block comprising a chamber connected to at least one valve, said at least one valve configured to receive liquid carbon dioxide, convert said liquid carbon dioxide into compressed gaseous carbon dioxide and solid carbon dioxide particles, and admit said liquid carbon dioxide and said solid carbon dioxide particles to said chamber, said pressing block being configured to supply an outflow of said compressed gaseous carbon dioxide and to receive mechanical energy to apply to a first pressing member disposed in said pressing block to press said solid carbon dioxide particles; and
   for each at least one pressing block, a power block comprising at least one actuator having at least one second pressing member movable in response to compressed gaseous carbon dioxide being applied to said actuator from said outflow, wherein movement of said second pressing member provides the mechanical energy received by said pressing block and applied to the first pressing member to press said solid carbon dioxide particles.

8. The apparatus of claim 7, wherein the chamber includes an end wall, and movement of the first pressing member caused by the mechanical energy to apply to a first pressing member compresses said solid carbon dioxide toward said end wall of the chamber.

9. The apparatus of claim 7, wherein: said actuator includes a gas cylinder; said gas cylinder includes said second pressing member and a sealing of said second pressing member; and said sealing contacts with said compressed gaseous carbon dioxide and remains operable at a temperature of said compressed gaseous carbon dioxide.

10. The apparatus of claim 9, wherein said second pressing member is connected to a crankshaft, said crankshaft transmitting said mechanical energy to said first pressing member.

11. The apparatus of claim 7 further comprising a collecting member that is: connected to the chamber; configured to receive said compressed gaseous carbon dioxide from the chamber; and connected to the at least one actuator to apply said outflow to said at least one actuator.

12. The apparatus of claim 11, wherein the chamber includes a filtering element configured to hold said solid carbon dioxide particles within said chamber while said compressed gaseous carbon dioxide inflows in the collecting member.

13. The apparatus of claim 7, wherein each at least one pressing block applies said mechanical energy to said first pressing member to press said solid carbon dioxide particles into solid carbon dioxide granules packed more densely than said solid carbon dioxide particles.

* * * * *